(12) United States Patent
Lindholm et al.

(10) Patent No.: US 8,666,118 B2
(45) Date of Patent: Mar. 4, 2014

(54) CONTROLLING AN IMAGE ELEMENT IN A REFLECTED ENERGY MEASUREMENT SYSTEM

(75) Inventors: Craig Calder Lindholm, Port Coquitlam (CA); Yingchun Lu, Port Coquitlam (CA)

(73) Assignee: Imagenex Technology Corp., Port Coquitlam BC (CA)

( * ) Notice: Subject to any disclaimer, the term of this patent is extended or adjusted under 35 U.S.C. 154(b) by 102 days.

(21) Appl. No.: 13/321,540

(22) PCT Filed: May 20, 2009

(86) PCT No.: PCT/CA2009/000754
§ 371 (c)(1),
(2), (4) Date: Nov. 18, 2011

(87) PCT Pub. No.: WO2010/132974
PCT Pub. Date: Nov. 25, 2010

(65) Prior Publication Data
US 2012/0063645 A1  Mar. 15, 2012

(51) Int. Cl.
*G06K 9/00* (2006.01)
(52) U.S. Cl.
USPC .......................................................... 382/106
(58) Field of Classification Search
None
See application file for complete search history.

(56) References Cited

U.S. PATENT DOCUMENTS

| | | |
|---|---|---|
| 3,389,372 A | 6/1968 | Halliday et al. |
| 3,773,605 A | 11/1973 | Pihlstrom |
| 4,030,062 A | 6/1977 | Diehl et al. |
| 4,170,766 A | 10/1979 | Pridham et al. |
| 4,190,818 A | 2/1980 | Follin et al. |
| 4,237,737 A | 12/1980 | Nitadori |
| 4,275,597 A | 6/1981 | Quedens et al. |
| 4,290,127 A | 9/1981 | Pridham et al. |
| 4,409,839 A | 10/1983 | Taenzer et al. |
| 4,571,711 A | 2/1986 | Chadwick |
| 4,686,532 A | 8/1987 | McAulay |
| 4,686,659 A * | 8/1987 | Yamamoto ..................... 367/87 |
| 4,688,045 A | 8/1987 | Knudsen |
| 4,817,614 A | 4/1989 | Hassler et al. |
| 4,935,906 A | 6/1990 | Baker et al. |
| 4,953,143 A | 8/1990 | Higgins et al. |

(Continued)

FOREIGN PATENT DOCUMENTS

| | | |
|---|---|---|
| JP | 62082379 | 4/1987 |
| JP | 5-16843 | 6/1993 |
| WO | WO 97/04334 | 2/1997 |
| WO | WO 2010/132974 | 11/2010 |

OTHER PUBLICATIONS

Blacquiere et al., "Multibeam echosounding: Beamforming versus interferometry", Oceanology International, Mar. 1998, 5 pages.

(Continued)

*Primary Examiner* — Bhavesh Mehta
*Assistant Examiner* — Siamak Harandi
(74) *Attorney, Agent, or Firm* — Baker & Hostetler LLP

(57) ABSTRACT

Controlling an image element associated with a distance from an energy measuring device, in a reflected energy measurement system involves producing at least one signal for controlling a common visible characteristic of the image element, in response to a plurality of signals representing respective intensities of reflected energy at respective different frequencies, measured at the energy measuring device at a time corresponding to the distance.

22 Claims, 17 Drawing Sheets

(56) References Cited

U.S. PATENT DOCUMENTS

| | | | |
|---|---|---|---|
| 5,034,931 | A | 7/1991 | Wells |
| 5,077,699 | A | 12/1991 | Passamante et al. |
| 5,216,640 | A | 6/1993 | Donald et al. |
| 5,349,524 | A | 9/1994 | Daft et al. |
| 5,515,850 | A | 5/1996 | Dias |
| 5,619,998 | A | 4/1997 | Abdel-Malek et al. |
| 5,647,365 | A | 7/1997 | Abboud |
| 5,793,703 | A | 8/1998 | Shippey |
| 5,822,276 | A | 10/1998 | Miklovic |
| 5,886,951 | A | 3/1999 | Wagstaff et al. |
| 6,052,335 | A | 4/2000 | Korolenko |
| 6,088,295 | A | 7/2000 | Altes |
| 6,130,641 | A | 10/2000 | Kraeutner et al. |
| 6,253,619 | B1 | 7/2001 | Danyluk et al. |
| 6,409,669 | B1 | 6/2002 | Hager et al. |
| 6,485,423 | B2 | 11/2002 | Angelsen et al. |
| 6,509,871 | B2 | 1/2003 | Bevington |
| 6,624,783 | B1 | 9/2003 | Rabideau |
| 6,654,315 | B1 | 11/2003 | Carter et al. |
| 6,784,835 | B2 | 8/2004 | Kohno et al. |
| 7,212,466 | B2 | 5/2007 | Wilson |
| 7,450,470 | B2 | 11/2008 | Wilson |
| 7,606,114 | B2 | 10/2009 | Bachelor et al. |
| 2006/0013068 | A1* | 1/2006 | Wilson ............. 367/111 |
| 2006/0013069 | A1* | 1/2006 | Wilson ............. 367/111 |
| 2008/0111448 | A1 | 5/2008 | Smith et al. |
| 2008/0127733 | A1 | 6/2008 | Kurkcu et al. |

OTHER PUBLICATIONS

Chapman, et al., "Visualizing underwater environments using multi-frequency sonar", Computer graphics and applications, IEEE, Sep.-Oct. 1999, 19(5), 61-65.

Hay, Alex, "Sound scattering from a particle-laden, turbulent jet", J. Acoust. Soc. Am., Oct. 1991, 90(4), Pt. 1, 2055-2074.

Hay, et al., "Vertical profiles of suspended sand concentration and size from multifrequency acoustic backscatter", Journal of Geophysical Research, Oct. 15, 1992, 97(C10), 15,661-15,677.

Holliday, et al. "Bioacoustical oceanography at high frequencies", ICES J. Marine Science, 1995, 52(3-4), 279-296.

International Patent Application No. PCT/CA2009/000754: International Search Report dated Feb. 10, 2010, 3 pages.

Katkovnik, Vladimir, "A new concept of adaptive beamforming for moving sources and impulse noise environment", Signal Processing, Sep. 2000, 80(9), 1863-1882.

Lau et al., "A dolph-chebyshev approach to the synthesis of array patterns for uniform circular arrays", IEEE International Symposium on Circuits and Systems, May 28-31, 2000, Geneva, Switzerland, 1-124-1-127.

Loggins, Chester, "Ahead-look sonars: Design comparisons and performance considerations", Underwater Systems Design, Jul./Aug. 1995, 15-23.

Makris et al., "1pUW18. Acoustic color of the Mid-Atlantic ridge", http:--www.auditory.org-asamtgs-asa94mit-1pUW-1pUW18.html, Access Date: Jan. 27, 2009, 1 page.

Neretti et al., "4aSP5. Sonar image enhancement via acoustic color", J. Acoust. Soc. Am., May 2004, 115(5), Pt. 2, 2547 (Abstract).

Osborne et al., "Vertical and horizontal structure in suspended sand concentrations and wave-induced fluxes over bedforms", Marine Geology, May 1996, 131, 195-208.

Texas Instruments TMS320C3x General-Purpose Applications User's Guide, Literature No. SPRU194, Jan. 1988, 6-80 to 6-101, Texas Instruments, Inc., U.S.A.

Thomenius, Kai, "Evolution of ultrasound beamformers", IEEE Ultrasonics Symposium, Nov. 1996, 2, 1615-1622.

Trevorrowa, Mark, "Comparison of multifrequency acoustic and in situ measurements of zooplankton abundances in Knight Inlet, British Columbia", J. Acoust. Soc. Am., Jun. 2005, 117(6), 3574-3588.

Urick, Robert, "Principles of underwater sound", McGraw-Hill, Inc., New York, $3^{rd}$ edition, 3.13 Multiplicative Arrays, 1983, 65.

* cited by examiner

CONTROLLING AN IMAGE ELEMENT IN A REFLECTED ENERGY MEASUREMENT SYSTEM

CROSS-REFERENCE TO RELATED APPLICATIONS

This application is the National Stage of International Application No. PCT/CA2009/000754 filed May 20, 2009, the disclosure of which is incorporated herein by reference in its entirety

BACKGROUND OF THE INVENTION

1. Field of Invention

This invention relates generally to imaging, and more particularly to controlling a common visible characteristic of an image element in response to amounts of reflected energy at respective different frequencies.

2. Description of Related Art

One known imaging technique is sonar, which is an acronym for "sound navigation and ranging". Known sonar techniques use propagation of sound through a medium such as water, for example, to measure location, shape, and other characteristics of objects that reflect sound, such as an ocean floor or objects on the ocean floor, for example. Conventional sonar devices may transmit a brief acoustic pulse, which may be referred to as a "ping", and over time receive and measure amounts or intensities of reflected energy from the acoustic pulse. Having regard to the speed that sound travels through the medium, the measured amounts or intensities of reflected energy over time may indicate respective distances or other characteristics of one or more reflective objects from a reference point.

One consideration for sonar or other reflected energy imaging applications is identifying an appropriate frequency of the energy to be transmitted, reflected, received, and measured. For example, in a sonar system for imaging in water, a lower frequency may facilitate imaging over a longer range, but a higher frequency may provide overall higher image quality. Disadvantageously, many known imaging devices require choosing a single frequency for use in generating an image, and therefore necessarily produce an image having the inherent disadvantages of the chosen frequency.

SUMMARY OF THE INVENTION

In accordance with one aspect of the invention, there is provided a method for controlling an image element associated with a distance from an energy measuring device, in a reflected energy measurement system. The method involves producing at least one signal for controlling a common visible characteristic of the image element, in response to a plurality of signals representing respective amounts of reflected energy at respective different frequencies, measured at the energy measuring device at a time corresponding to the distance.

The different frequencies may be non-harmonic.

The different frequencies may include at least first, second, and third frequencies, the first frequency being less than the second frequency, and the second frequency being less than the third frequency.

The visible characteristic may include a shade of a pre-defined colour.

The visible characteristic may include a colour.

The colour may include a combination of first, second, and third additive colours having respective intensities corresponding to the amounts of the reflected energy at the first, second, and third frequencies respectively.

The first additive colour may have a wavelength greater than a wavelength of the second additive colour, and the wavelength of the second additive colour may be greater than a wavelength of the third additive colour.

The first additive colour may be red, the second additive colour may be green, and the third additive colour may be blue.

The amounts of the reflected energy may include substantially simultaneously measured amounts of the reflected energy at the respective different frequencies.

The method may further involve causing energy to be transmitted at the different frequencies prior to the producing, to facilitate measurement of the reflected energy received at the energy measuring device.

In accordance with another aspect of the invention, there is provided an imaging method in a reflected energy measurement system. The imaging method involves defining a display co-ordinate system having an axis, for use by an image generator. The imaging method also involves defining a plurality of image elements generally along the axis, and associating successive respective positions of the image elements with successive respective distances from an energy measuring device. The imaging method also involves producing signals for causing the image generator to control each of the image elements, according to the method for controlling an image element.

In accordance with another aspect of the invention, there is provided a computer readable medium encoded with codes for directing a processor to carry out the method for controlling an image element.

In accordance with another aspect of the invention, there is provided a computer readable medium encoded with codes for directing a processor to carry out the imaging method.

In accordance with another aspect of the invention, there is provided an imaging apparatus for controlling an image element associated with a distance from an energy measuring device, in a reflected energy measurement system. The apparatus includes provisions for receiving a plurality of signals from the energy measuring device, the plurality of signals representing respective amounts of reflected energy at respective different frequencies at a time corresponding to the distance. The apparatus also includes provisions in communication with the provisions for receiving, for producing at least one signal for controlling a common visible characteristic of the image element, in response to the plurality of signals.

The different frequencies may be non-harmonic.

The different frequencies may include at least first, second, and third frequencies, the first frequency being less than the second frequency, and the second frequency being less than the third frequency.

The visible characteristic may include a shade of a pre-defined colour, and the provisions for producing may include provisions for producing shade signals representing the shade of the pre-defined colour.

The visible characteristic may include a colour, and the provisions for producing may include provisions for producing colour signals representing the colour.

The provisions for producing colour signals may include provisions for producing first, second, and third additive colour signals representing first, second, and third additive colours respectively, having respective intensities corresponding to the amounts of the reflected energy at the first, second, and third frequencies respectively.

The first additive colour may have a wavelength greater than a wavelength of the second additive colour, and the wavelength of the second additive colour may be greater than a wavelength of the third additive colour.

The first additive colour may be red, the second additive colour may be green, and the third additive colour may be blue.

The amounts of the reflected energy may include substantially simultaneously measured amounts of the reflected energy.

The apparatus may further include provisions for causing energy to be transmitted at the different frequencies, to facilitate measurement of the reflected energy.

The apparatus may further include provisions for defining a display co-ordinate system having an axis, for use by an image generator. The apparatus may also include provisions for defining a plurality of image elements generally along the axis, and provisions for associating successive respective positions of each of the plurality of image elements with successive respective distances from the energy measuring device. The provisions for producing may include provisions for producing at least one signal for controlling a respective common visible characteristic of each of the plurality of image elements.

In accordance with another aspect of the invention, there is provided an imaging apparatus for controlling an image element associated with a distance from an energy measuring device, in a reflected energy measurement system. The apparatus includes a processor in communication with the energy measuring device and operably configured to receive a plurality of signals from the energy measuring device, the plurality of signals representing respective amounts of reflected energy at respective different frequencies at a time corresponding to the distance. The apparatus also includes a computer readable medium in communication with the processor and encoded with codes for directing the processor to produce at least one signal for controlling a common visible characteristic of the image element, in response to the plurality of signals.

The different frequencies may be non-harmonic.

The different frequencies may include first, second, and third frequencies, the first frequency being less than the second frequency, and the second frequency being less than the third frequency.

The visible characteristic may include a shade of a pre-defined colour, and the codes may include codes for directing the processor to produce shade signals representing the shade of the pre-defined colour.

The visible characteristic may include a colour, and the codes may include codes for directing the processor to produce colour signals representing the colour.

The codes may include codes for directing the processor to produce first, second, and third additive colour signals representing first, second, and third additive colours respectively, having respective intensities corresponding to the amounts of the reflected energy at the first, second, and third frequencies respectively.

The first additive colour may have a wavelength greater than a wavelength of the second additive colour, and the wavelength of the second additive colour may be greater than a wavelength of the third additive colour, The first additive colour may be red, the second additive colour may be green, and the third additive colour may be blue.

The amounts of the reflected energy may include substantially simultaneously measured amounts of the reflected energy.

The codes may include codes for directing the processor to cause energy to be transmitted at the different frequencies, to facilitate measurement of the reflected energy.

The codes may include codes for directing the processor to define a display co-ordinate system having an axis, for use by an image generator. The codes may also include codes for directing the processor to define a plurality of image elements generally along the axis, and to associate successive respective positions of each of the plurality of image elements with successive respective distances from the energy measuring device. The codes may further include codes for directing the processor to produce at least one signal for controlling a respective common visible characteristic of each of the plurality of image elements.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
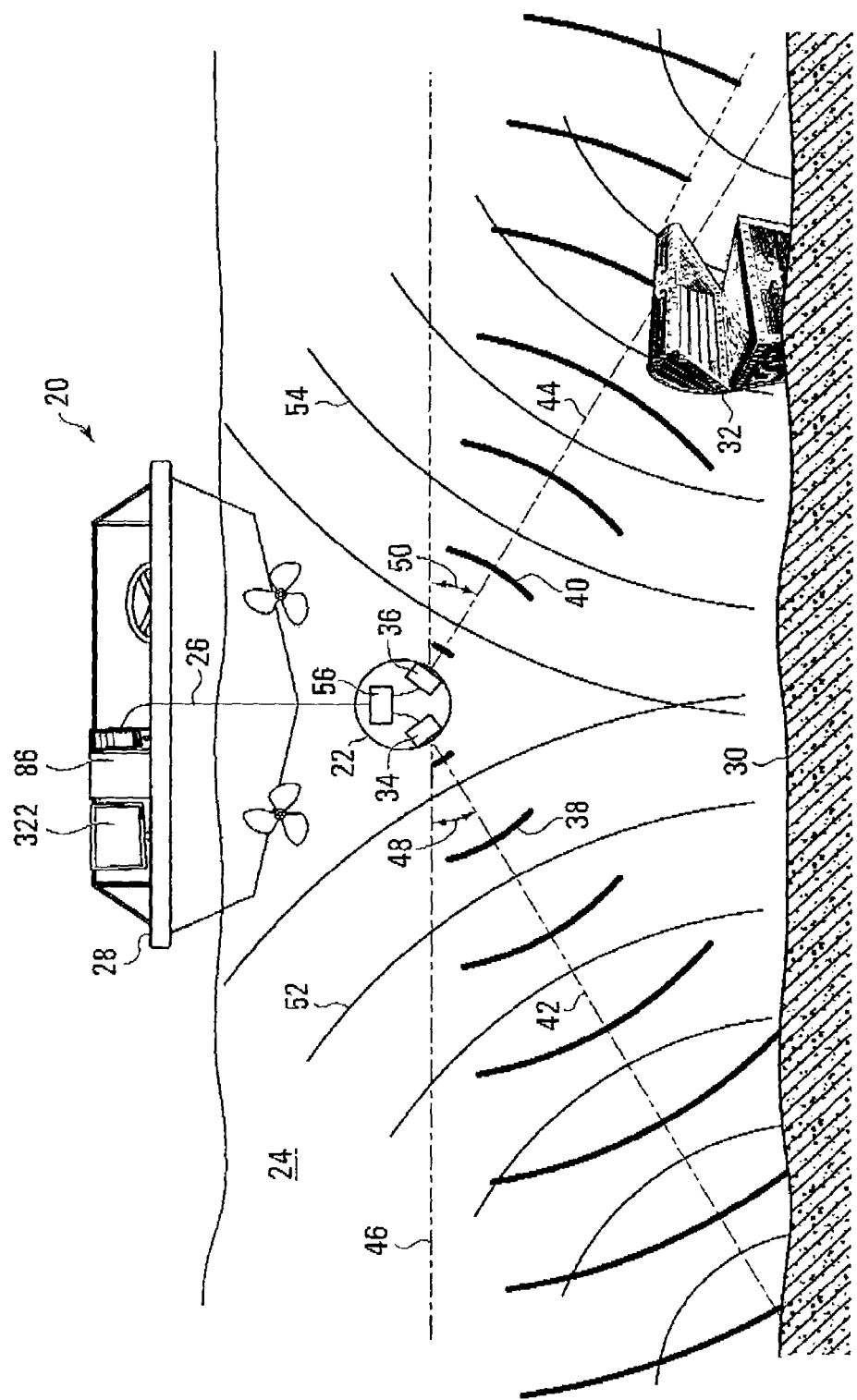
FIG. 1 is a rear elevational view of a reflected energy measurement system in accordance with a first embodiment of the invention.

Referring to FIG. 1, a reflected energy measurement system in accordance with a first embodiment of the invention is shown generally at 20, and includes a port and starboard transducer unit 22 submerged in water 24 and towed by a cable 26 behind a boat 28. In the illustrated embodiment, the port and starboard transducer unit 22 (which may also be referred to as a "tow fish") is configured for performing side-scan sonar imaging in the water 24 of an ocean floor 30, and of other submerged objects such as the submerged object 32, for example. However, it will be appreciated that alternative embodiments of the invention may involve techniques other than side-scan sonar, and may include rotary-scan sonar or ultrasound, for example.

The port and starboard transducer unit 22 includes a port transducer unit 34 and a starboard transducer unit 36, which are configured to transmit acoustic pulses or pings 38 and 40, on port and starboard sides respectively of the port and starboard transducer unit 22, at a plurality of different frequencies. The acoustic pulses 38 and 40 propagate through the water 24, centered generally about port and starboard signal emission paths 42 and 44 respectively, which in the illustrated embodiment are oriented below a horizontal axis 46 by angles 48 and 50 respectively. The angles 48 and 50 may be approximately 20°, for example.

As the acoustic pulses 38 and 40 propagate through the water 24, these pulses reflect off of objects such as the ocean floor 30 and the submerged object 32, for example, resulting in reflected acoustic pulses, such as the port and starboard reflected acoustic pulses shown at 52 and 54 respectively. Amounts of energy of the port and starboard reflected acoustic pulses 52 and 54 are measured at the port and starboard transducer units 34 and 36 respectively.

The port and starboard transducer unit 22 also includes a control assembly 56 in communication with the port and starboard transducer units 34 and 36.

Figure 2:
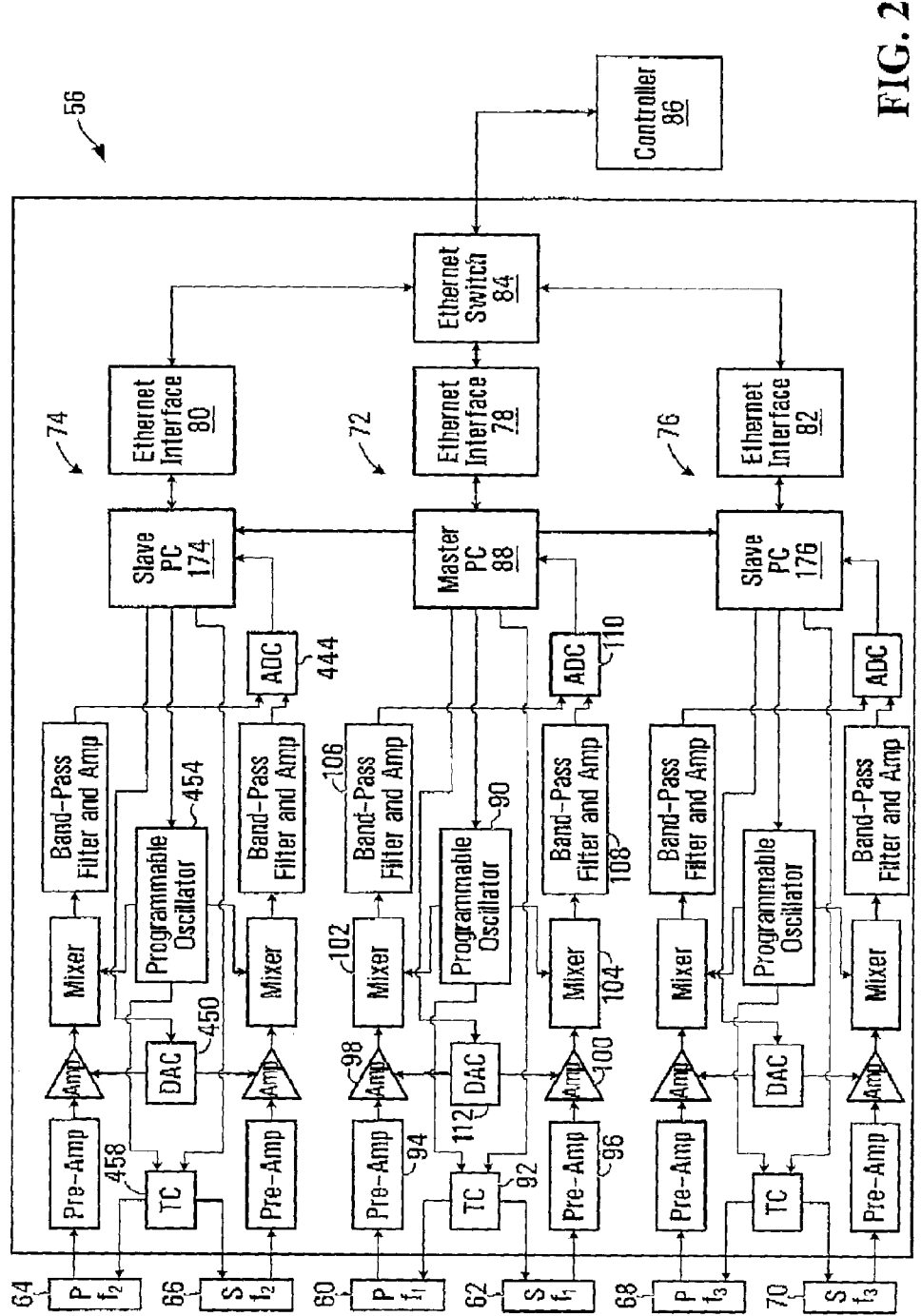
FIG. 2 is a schematic illustration of a control assembly of the reflected energy measurement system of FIG. 1.

Referring to FIG. 2, the control assembly 56 is illustrated schematically. In the illustrated embodiment, the port and starboard transducer unit (22) is configured to transmit and receive acoustic pulses at three different frequencies, and therefore includes first and second transducers 60 and 62 for transmitting and receiving acoustic pulses on port and starboard sides respectively at a first frequency, third and fourth transducers 64 and 66 for transmitting and receiving acoustic pulses on port and starboard sides respectively at a second frequency, and fifth and sixth transducers 68 and 70 for transmitting and receiving acoustic pulses on port and starboard sides respectively at a third frequency. The port and starboard transducer unit (22) may thus be referred to as an "energy transmitting device" and as an "energy measuring device".

Still referring to FIG. 2, the control assembly 56 includes a first control component 72 for controlling and receiving signals from the first and second transducers 60 and 62, a second control component 74 for controlling and receiving signals from the third and fourth transducers 64 and 66, and a third control component 76 for controlling and receiving signals from the fifth and sixth transducers 68 and 70. The control components 72, 74, and 76 include respective Ethernet interfaces 78, 80, and 82 for communicating with an Ethernet switch 84. The Ethernet switch 84 is in communication with a controller 86, which in the illustrated embodiment, may be a general-purpose computer on the boat 28, for example, as illustrated in FIG. 1.

Still referring to FIG. 2, the first control component 72 includes a first processor circuit 88, which may also be referred to as a "master processor circuit". The first processor circuit 88 is in communication with a programmable oscillator 90, which is in communication with transmit circuitry (TC) 92 for causing the first and second transducers 60 and 62 to transmit acoustic pulses on port and starboard sides respectively, at a programmable frequency. The first and second transducers 60 and 62 are also in communication with respective pre-amplification circuits 94 and 96, which in turn are in communication with respective amplifiers 98 and 100, for receiving and amplifying signals representing amounts of reflected energy measured at the first and second transducers 60 and 62.

The amplifiers 98 and 100 are in communication with respective mixers 102 and 104, which multiply signals received from the amplifiers 98 and 100 with signals received from the programmable oscillator 90 for heterodyning the signals received from the amplifiers 98 and 100. As is well-known in the art, the product signals of mixers 102 and 104 are linear combinations of a high-frequency component and a low-frequency component. The product signals from the mixers 102 and 104 are passed through respective band-pass filters and amplifiers 106 and 108 to diminish the high-frequency component of the signals and to amplify the low-frequency component, which facilitates measurement of an amplitude of the signals received at the first and second transducers 60 and 62. Signals received from the band-pass filters and amplifiers 106 and 108 are received at a two-channel analog to digital converter 110, which produces signals for the first processor circuit 88 representing amounts of reflected energy measured at the first and second transducers 60 and 62. The first processor circuit 88 is also in communication with a digital to analog converter 112, which generates gain signals for the amplifiers 98 and 100 in response to signals from the first processor circuit 88.

Figure 3:
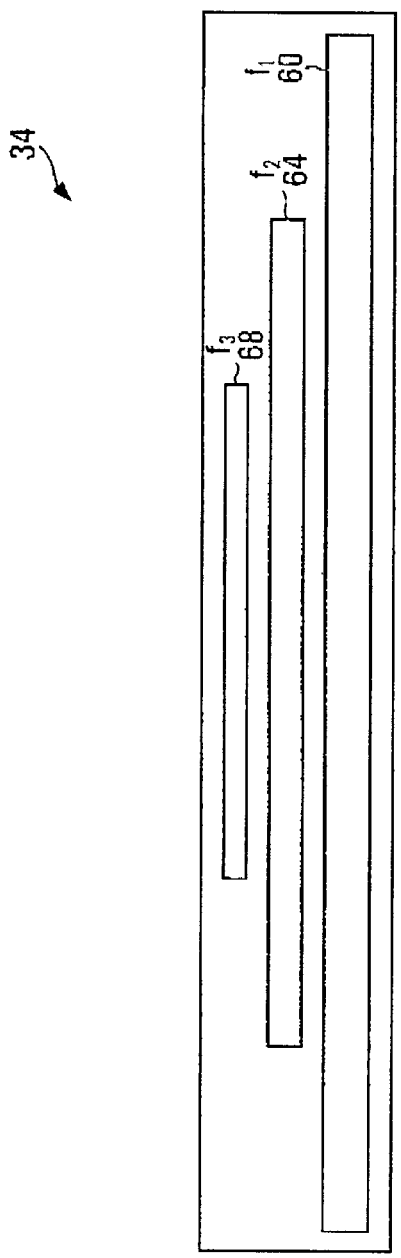
FIG. 3 is a front elevational view of a pork transducer unit of the reflected energy measurement system of FIG. 1.

Referring to FIG. 3, the port transducer unit 34 is illustrated, and includes the first, third, and fifth transducers 60, 64, and 68 that are on the port side of the port and starboard transducer unit (22) and illustrated in FIG. 2. In the illustrated embodiment, the first transducer 60 is configured to transmit and receive acoustic signals at a first frequency, the third transducer 64 is configured to transmit and receive acoustic signals at a second frequency, and the fifth transducer 68 is configured to transmit and receive signals at a third frequency. In this embodiment, the first frequency is less than the second frequency, and the second frequency is less than the third frequency, and therefore the first transducer 60 is larger than the third transducer 64, and the third transducer 64 is larger than the fifth transducer 68. In a preferred embodiment, the first frequency of the first transducer 60 may be 120 kHz, the second frequency of the third transducer 64 may be 260 kHz, and the third frequency of the fifth transducer 68 may be 675 kHz, for example. It has been found that these frequencies may be useful over desirable ranges for imaging in certain marine environments. These frequencies are also desirably not harmonics, thus advantageously minimizing potential for interference during simultaneous transmission and measurement. In a different application, such as ultrasound, desirable first, second, and third frequencies may be 5 MHz, 12 MHz, and 22 MHz respectively, or 5 MHz, 16 MHz, and 22 MHz respectively, for example.

The starboard transducer unit (36) is configured similarly to the port transducer unit 34, but includes the second, fourth, and sixth transducers 62, 66, and 70, which in this embodiment are configured to transmit and receive acoustic pulses at frequencies the same as the frequencies of the first, third, and fifth transducers 60, 64, and 68 respectively.

Figure 4:
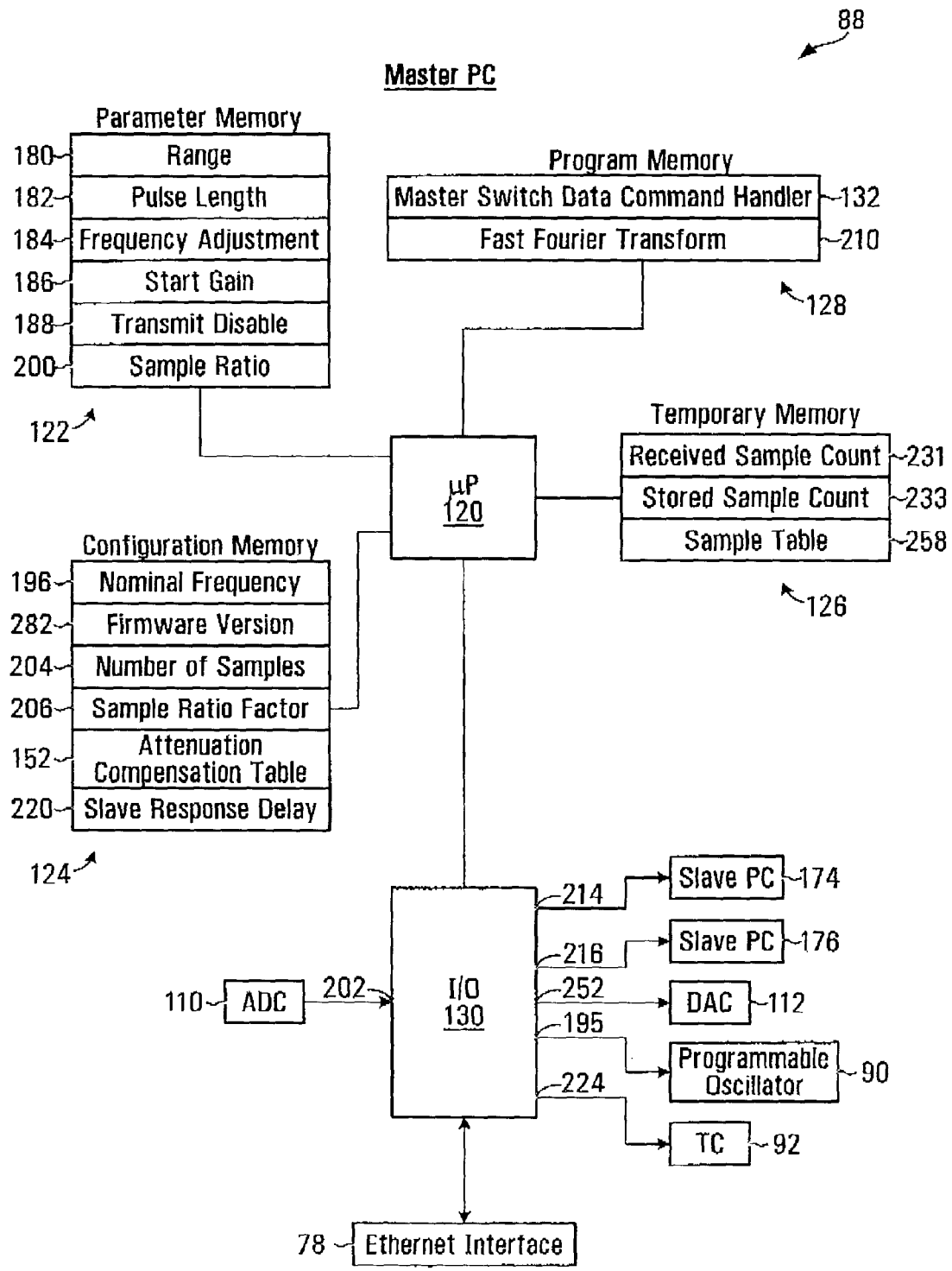
FIG. 4 is a schematic illustration of a first processor circuit of the control assembly of FIG. 2.

Referring to FIG. 4, the first processor circuit 88 (or "master processor circuit") is illustrated schematically, and includes a microprocessor 120, and parameter memory 122, configuration memory 124, temporary memory 126, program memory 128, and an input output ("I/O") 130, all in communication with the microprocessor 120. The various memories illustrated in FIG. 4 may be random access memory (RAM)

or magnetic media, for example, or a combination of these or numerous other computer-readable storage media that are well-known in the art.

The program memory 128 is a computer-readable medium that includes codes for directing the microprocessor 120 to carry out functions of the first processor circuit 88. For example, the program memory 128 includes codes that direct the microprocessor 120 to act as a switch data command handler 132 for handling a switch data command that is received at the Ethernet interface 78. Generally, and referring back to FIG. 2, switch data commands in this embodiment are received at the Ethernet interfaces 78, 80, and 82 from the controller 86, and cause data to be collected by the port and starboard transducer unit (22) and transmitted to the controller 86. In this embodiment, the Ethernet interfaces 78, 80, and 82 of the processor circuits 88, 174, and 176 have distinct IP addresses, and thus a switch data command may be addressed to a particular processor circuit at a respective IP address.

Figure 5:
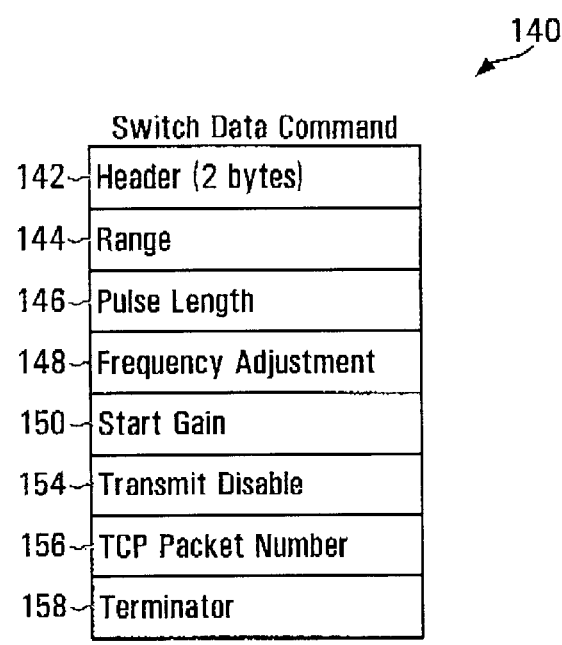
FIG. 5 is a schematic illustration of a switch data command of the reflected energy measurement system of FIG. 1.

Referring to FIG. 5, a switch data command is illustrated schematically at 140. Preferably, the switch data command 140 is encoded in an Internet protocol ("IP") packet, and includes various fields for storing data for controlling the first processor circuit 88 shown in FIG. 4. In one embodiment, the switch data command 140 includes a header field 142, consisting of two bytes storing a pre-defined hexadecimal value to indicate a switch data header.

The switch data command 140 also includes a range field 144, which preferably stores in one byte a value representing a number of meters of range over which to collect reflected energy amounts from an acoustic pulse. In a preferred embodiment, the value stored in the range field 144 may be limited to be at least 10 and less than or equal to 200, for example.

The switch data command 140 also includes a pulse length field 146 for storing a pulse length value for controlling a duration of an acoustic pulse generated by the first and second transducers 60 and 62 that are shown in FIG. 2. In some embodiments, the pulse length field 146 may store a value representing a number of 10 µs increments for the duration of the pulse. In these embodiments, the pulse length is determined as the number stored in the pulse length field 146 multiplied by 10 µs. In other embodiments, the pulse length field 146 may be omitted, and the pulse length may be dependent on the range specified by the range field 144. For example, for a range less than or equal to 100 meters, a default pulse length of 100 µs may be used, and for a range greater than or equal to 125 meters, a pulse length of 300 µs may be used.

The switch data command 140 also includes a frequency adjustment field 148 for storing a frequency adjustment value for adjusting the frequency of the acoustic pulses generated at the first and second transducers (60 and 62) from a nominal frequency for those transducers. In some embodiments, a value of 100 in the frequency adjustment field 148 may cause the first and second transducers (60 and 62) to transmit at their nominal frequency, and differences in the value of the frequency adjustment field 148 above or below 100 may represent adjustments from the nominal frequency in 100 Hz increments, for example. In the illustrated embodiment, the nominal frequency of the first and second transducers (60 and 62) is 120 kHz, and a value of 100 in the frequency adjustment field 148 causes the first and second transducers (60 and 62) to transmit acoustic pulses at that nominal frequency. However, in this embodiment, a value of 200 in the frequency adjustment field 148 would indicate an Increase of 100 increments of 100 Hz, for an increase of 10 kHz so that the first and second transducers transmit acoustic pulses at a frequency of 130 kHz.

The switch data command 140 also includes a start gain field 150, which stores a number in decibels representing an initial gain for the amplifiers 98 and 100 (shown in FIG. 2). In some embodiments, the gain determined by the start gain field 150 is preferably increased from the initial gain, as reflected energy is measured over increasing distances, to compensate for attenuation of the acoustic pulse. Attenuation compensation in these embodiments is discussed below, and involves an attenuation compensation table 152 in the configuration memory 124 (shown in FIG. 4). However, in alternative embodiments, the amplifiers (98 and 100) and the digital to analog converter 112 may be omitted, and attenuation compensation may be accomplished by calculations performed by the microprocessor 120 (shown in FIG. 4), for example.

The switch data command 140 also includes a transmit disable field 154 for storing a Boolean value to enable or disable transmission of acoustic signals by the first and second transducers 60 and 62. The switch data command 140 also includes a TCP packet number field 156 for indicating the type of data to return in response to the switch data command 140. In one embodiment, a pre-defined hexadecimal value in the TCP packet number field 156 causes the first processor circuit (88) to return port data, whereas a different pre-defined hexadecimal value in the TCP packet number field 156 causes the first processor circuit (88) to return starboard data. The switch data command 140 also includes a terminator field 158, which, in some embodiments, is a pre-defined hexadecimal value. In these embodiments, the remaining fields of the switch data command 140 should not include the hexadecimal value of the terminator field 158, in order to avoid possible confusion with the terminator field 158.

Figure 6:
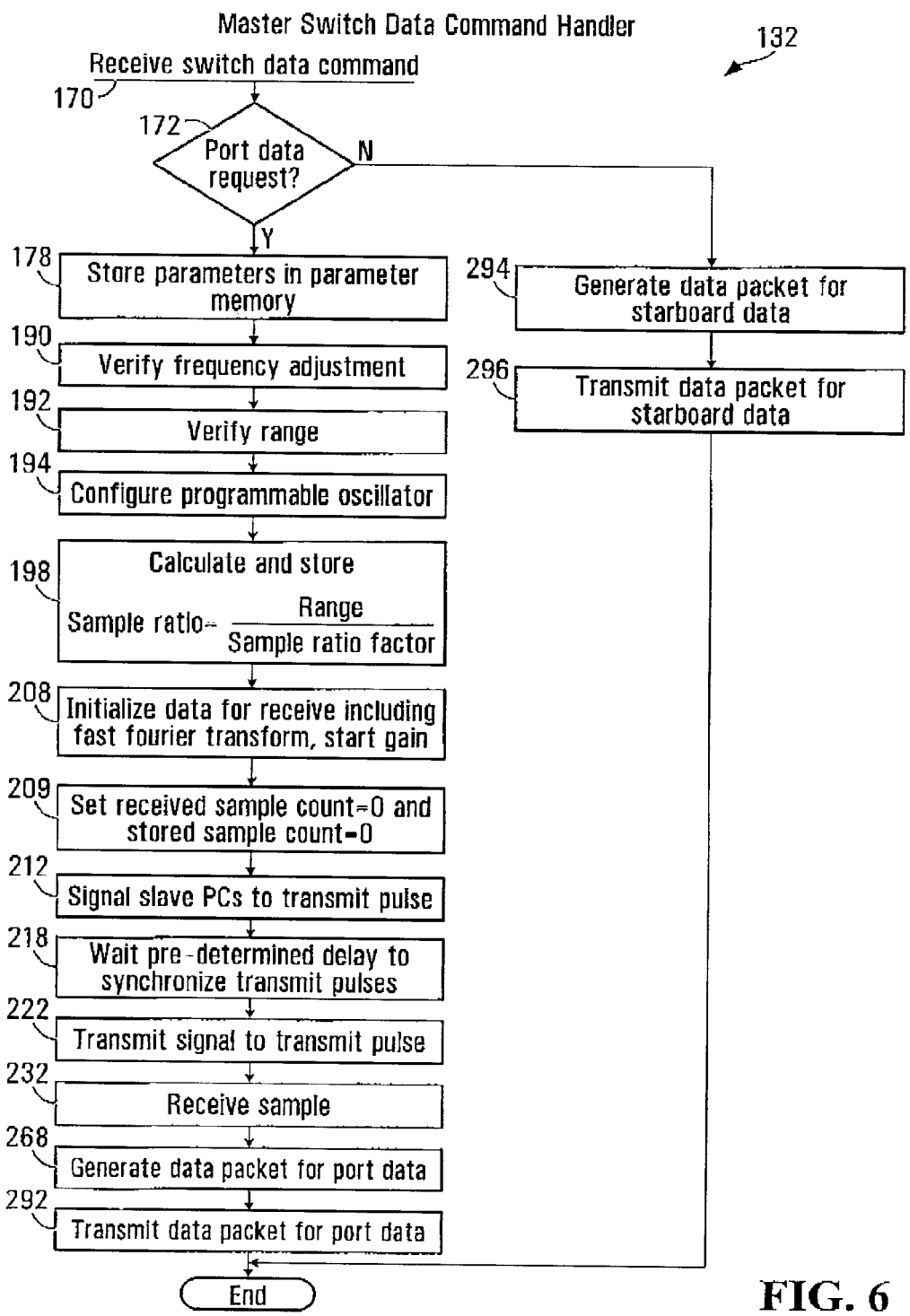
FIG. 6 is a schematic illustration of a master switch data command handler executed by the first processor circuit of FIG. 4.

Referring to FIG. 6, the switch data command handler 132 of the first (or "master") processor circuit (88), which may also be referred to as the "master switch data command handler", is illustrated schematically. The master switch data command handler 132 includes blocks of code represented by functional blocks shown in FIG. 6 for directing the microprocessor 120 (shown in FIG. 4) to respond to a switch data command 140 (shown in FIG. 5). The master switch data command handler 132 begins at 170 in response to an interrupt generated by the I/O 130 in response to a switch data command 140 received at the Ethernet interface 78 (shown in FIGS. 2, 4, and 5).

The master switch data command handler 132 continues at block 172, which directs the microprocessor (120) to determine whether the contents of the TCP packet number field 156 (shown in FIG. 5) indicate that port data is requested. In this embodiment, a switch data command (140) requesting port data from the first processor circuit (88) represents a general request for data from the port and starboard transducer unit 22 shown in FIG. 1, and causes the port and starboard transducer unit to transmit and receive port and starboard data at all three frequencies. Therefore, referring back to FIG. 2, in response to a switch data command (140) requesting port data, the first processor circuit 88 will cause the first and second transducers 60 and 62 to transmit an acoustic pulse, and the first processor circuit 88 will also communicate with second and third processors circuits 174 and 176 in the second and third control components 74 and 76 respectively, to cause the third, fourth, fifth, and sixth transducers 64, 66, 68, and 70 to transmit acoustic pulses simultaneously, or as close to simultaneously as reasonably achievable, with the first and second transducers 60 and 62.

Therefore, the first processor circuit 88 may alternatively be referred to as a master processor circuit, and the second and third processors circuits 174 and 176 may be referred to as slave processor circuits.

Referring to FIGS. 4 and 6, if at block 172 the first processor circuit (88) receives a switch data command (140) having a TCP packet number field (156) denoting a port data request, then the master switch data command handler 132 continues at block 178, which directs the microprocessor (120) to store the values from the range field 144, the pulse length field 146, the frequency adjustment field 148, the start gain field 150, and the transmit disable field 154 of the switch data command 140 (shown in FIG. 5) into respective stores in the parameter memory 122, namely a range store 180, a pulse length store 182, a frequency adjustment store 184, a start gain store 186, and a transmit disable store 188 respectively, as illustrated in FIG. 4.

Still referring to FIGS. 4 and 6, the master switch data command handler 132 continues at block 190, which directs the microprocessor (120) to verify whether the frequency adjustment value in the frequency adjustment store 184 (illustrated in FIG. 4) has a permissible value. In this embodiment, the codes in block 190 direct the microprocessor (120) to determine whether the frequency adjustment value in the frequency adjustment store 184 is a number less than or equal to 200. In the illustrated embodiment, if at block 190 the frequency adjustment value in the frequency adjustment store 184 is not within a permissible value, then the frequency adjustment store 184 is configured to store a default value, such as 100 indicating a nominal frequency, for example.

The master switch data command handler 132 continues at block 192, which directs the microprocessor (120) to verify that the range value in the range store 180 (illustrated in FIG. 4). In this embodiment, the codes in block 192 direct the microprocessor (120) to verify that the range value in the range store (180) is a number greater than or equal to 10 and less than or equal to 200. Again, in this embodiment, if at block 192 the range value in the range store (180) is not a number greater than or equal to 10 or less than or equal to 200, the range store (180) is configured to store a default value, such as 100, for example.

The master switch data command handler 132 continues at block 194, which directs the microprocessor (120) to configure the programmable oscillator 90 illustrated in FIGS. 2 and 4. Referring to FIG. 4, the I/O 130 in the illustrated embodiment includes a programmable oscillator port 195 for sending signals to the programmable oscillator 90. Referring back to FIG. 6, the codes in block 194 direct the microprocessor (120) to configure the programmable oscillator 90 to cause the first and second transducers (60 and 62) to transmit an acoustic pulse at a configured frequency. Referring to FIG. 4; the configuration memory 124 in this embodiment includes a nominal frequency store 196 for storing a pre-configured nominal frequency, and as discussed above, the frequency adjustment store 184 of the parameter memory 122 includes a number for use by the microprocessor to control the programmable oscillator 90 to cause the frequency of acoustic energy produced by the first and second transducers (60 and 62) to be an increment in a multiple of 100 Hz above or below the nominal frequency of the first and second transducers.

Referring back to FIG. 6, the master switch data command handler 132 continues at block 198, which directs the microprocessor (120) to calculate a sample ratio value S for storing in a sample ratio store 200 in the parameter memory 122.

By way of background, if M samples of reflected energy intensity are to be stored following an acoustic pulse, and those M samples are to be measured over a range R through a medium where the acoustic pulse travels at a speed V, then samples should be measured at intervals of time T that are identified by the following relationship:

$$T = \frac{2R}{VM}$$

Referring to FIG. 4, the analog to digital converter 110 in this embodiment produces signals, representing amplitudes of signals received from the band-pass filters and amplifiers 106 and 108), at a fixed frequency of 75 kHz, and thus signals are available at sampling intervals I of approximately 13 μs. The I/O 130 of this embodiment includes an analog to digital converter port 202 for receiving signals from the analog to digital converter 110. However, in this embodiment, the interval of time T is longer than the sampling interval I of 13 μs, and therefore only a fraction of the samples of measured amounts of reflected energy that are received at the analog to digital converter port 202 must be selected to be stored. In this embodiment, the sample ratio value S, to be stored in the sample ratio store 200, indicates a ratio of samples received at the analog to digital converter port 202 to the number of samples M to be stored. Essentially, every Sth sample value is stored, and the sample ratio value S is identified by the following relationship:

$$S = \frac{T}{I}.$$

Therefore, combining the foregoing relationships, $$SI = T = \frac{2R}{VM} \text{ and } S = \frac{2R}{VMI}.$$

In this embodiment, the number of samples M to be stored is pre-configured and represented by a value stored in a number of samples store 204 in the configuration memory 124. Also in this embodiment, where V (the speed of sound propagation in salt water) is approximately 1500 m/s, M=1000, and I is approximately 13 μs, then $$S \approx \frac{2R}{(1500)(1000)(13 \times 10^{-6})} \approx \frac{R}{9.75},$$

where R is a number of metres. Therefore, in summary, the sample ratio value S for storing in a sample ratio store 200 may be calculated approximately in this embodiment by dividing the range R (in metres) by 10. To simplify calculations in this embodiment, the denominator 10 is represented as a sample ratio factor stored in a sample ratio factor store 206 in the configuration memory 124

Therefore, referring back to FIGS. 4 and 6, the codes at block 198 in this embodiment calculate and store a sample ratio value S for the sample ratio store 200 by dividing the range value in the range store 180 by the sample ratio factor stored in the sample ratio factor store 206, which is 10 in this embodiment. Thus, for example, if the range specified by the range store 180 is 150 meters, then in this embodiment, the sample ratio calculated at block 198 and stored in the sample ratio store 200 will be 150 divided by 10, or 15, and thus 1 of every 15 samples received at the analog to digital converter port 202 will be stored as a sample value. However, in other embodiments, the sample ratio factor store 206 may vary with the speed V that the relevant energy travels through the relevant medium, with the desired number of samples M, and with the sampling interval I.

Still referring to FIG. 6, the master switch data command handler 132 continues at block 208, which directs the microprocessor (120) to initialize a fast Fourier transform implemented by codes in a fast Fourier transform store 210 of the program memory 128, as illustrated in FIG. 4. Block 208 also directs the microprocessor to initialize a sample table (258, illustrated in FIG. 8 and discussed below) by clearing data stores in the sample table and initializing pointers to the data stores in the sample table. Also, block 208 directs the microprocessor (120) to transmit the start gain value from the start gain store (186) to the digital to analog converter (112).

The master switch data command handler 132 continues at block 209, which directs the microprocessor (120) to set values stored in a received sample count store 231 and a stored sample count store 233 in the temporary memory 126 (illustrated in FIG. 4) to be 0.

The master switch data command handler 132 continues at block 212, which directs the microprocessor (120) to cause the second and third processor circuits 174 and 176 (shown in FIG. 2) to transmit acoustic pulses. Referring to FIG. 4, the I/O 130 in the illustrated embodiment includes first and second processor circuit ports 214 and 216 for communicating with the second and third processor circuits 174 and 176 respectively.

The master switch data command handler 132 continues at block 218, which directs the microprocessor (120) to wait a pre-determined period of time, as determined by a value in a slave response delay store 220 in the configuration memory 124 illustrated in FIG. 4. Referring to FIGS. 4 and 6, it has been found that the second and third processor circuits 174 and 176 respond to signals transmitted at block 212 with some delay, and that a delay for a pre-configured period of time at block 218 may advantageously facilitate simultaneous transmission of acoustic pulses from the first, second, third, fourth, fifth, and sixth transducers 60, 62, 64, 66, 68, and 70 (shown in FIG. 2).

Referring back to FIG. 6, the master switch data command handler 132 continues at block 222, which directs the microprocessor (120) to cause the first and second transducers (60 and 62) to transmit an acoustic signal. Referring to FIG. 4, the I/O 130 in the illustrated embodiment includes a transmit circuitry port 224 for transmitting signals to the transmit circuitry 92 for causing the first and second transducers 60 and 62 (illustrated in FIG. 2) to transmit an acoustic pulse.

Referring back to FIG. 6, the master switch data command handler 132 continues at block 232, which may also be referred to as a "receive sample routine", and which directs the microprocessor (120) to receive and handle signals generated by the I/O (130) when a signal from the analog to digital converter (110) is received at the analog to digital converter port (202).

Figure 7:
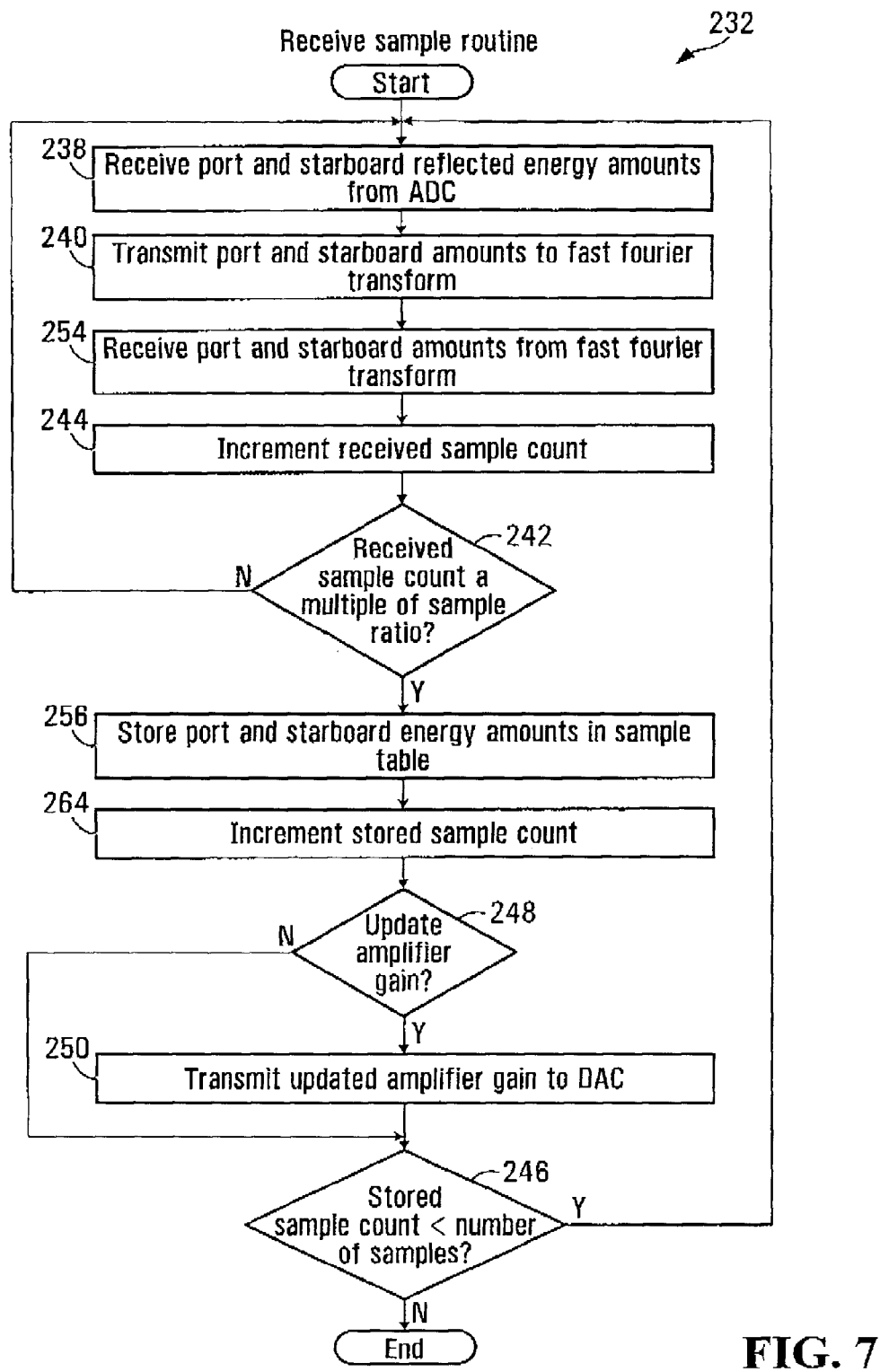
FIG. 7 is a schematic illustration of a receive sample routine executed by the first processor circuit of FIG. 4.

Referring to FIG. 7, the codes of block 232 are illustrated schematically, and begin at block 238, which directs the microprocessor (120) to receive values representing amounts of reflected energy measured at the first and second transducer 60 and 62 (illustrated in FIG. 2). The receive sample routine 232 continues at block 240, which directs the microprocessor (120) to transmit port and starboard data reflected energy amounts (measured by the first and second transducers 60 and 62 respectively) to the fast Fourier transformer 210 (illustrated in FIG. 4). The receive sample routine 232 continues at block 254, which directs the microprocessor (120) to receive port and starboard reflected energy amounts from the fast Fourier Transform (210). Energy amounts received from the fast Fourier transform (210) at block 254 represent amounts of reflected energy at a particular frequency, as measured at the first and second transducers (60 and 62).

The receive sample routine 232 continues at block 244, which directs the microprocessor (120) to increment the value stored in the received sample count store 231 (illustrated in FIG. 4).

The receive sample routine 232 continues at block 242, which directs the microprocessor (120) to determine whether the value stored in the received sample count store 231 is a multiple of the value stored in the sample ratios store 200 (illustrated in FIG. 4). If not, then the present sample values will not be stored, and the receive sample routine 232 returns to block 238 described above.

However, if at block 242, the received sample count is a multiple of the sample ratio, then the receive sample routine 232 continues at block 256, which directs the microprocessor (120) to store the port and starboard energy amounts received from the fast Fourier transform (210) in a sample table 258 in the temporary memory 126 (illustrated in FIG. 4).

Figure 8:
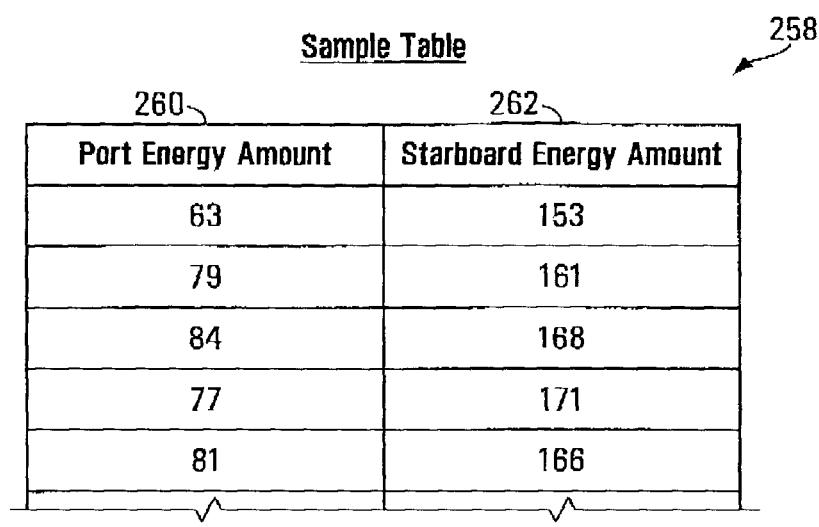
FIG. 8 is a schematic illustration of a sample table of the first processor circuit of FIG. 4.

Referring to FIG. 8, an exemplary sample table is illustrated generally at 258. In this embodiment, the sample table 258 is a two-dimensional array of bytes, having a first column 260 for storing port energy amounts, and a second column 262 for storing starboard energy amounts. The sample table 258 includes a plurality of rows representing successive times at which successively acquired port and starboard energy amounts are stored, and the stored energy amounts are normalized to values between 0 and 255 representing relative amounts of energy to be stored in a single byte.

Referring back to FIG. 7, the receive sample routine 232 continues at block 264, which directs the microprocessor (120) to increment the value stored in the stored sample count store 233 (illustrated in FIG. 4).

The receive sample routine 232 continues at block 248, which directs the microprocessor (120) to determine whether to update the gain of the amplifiers 98 and 100 (showed in FIG. 2). As set out above, in some embodiments, the amplifiers (98 and 100) amplify signals received from the pre-amplification circuits (94 and 96) respectively, to compensate for acoustic pulse attenuation as signals are received from successively greater distances. Also as indicated above, in some embodiments, an attenuation compensation table 152 (illustrated in FIG. 4) stores attenuation compensation values associated with respective received sample counts, as identified by the received sample count store 231 (illustrated in FIG. 4). Therefore, the codes at block 248 preferably determine an appropriate attenuation compensation factor from the attenuation compensation table (152) associated with the value stored in the received sample count store (231).

If at block 248 a current gain of the amplifiers 98 and 100 (illustrated in FIG. 2) should be updated, then the receive sample routine 232 continues at block 250, which directs the microprocessor (120) to transmit an updated amplifier gain to the digital to analog converter 112 (illustrated in FIG. 2). Referring to FIG. 4, the I/O 130 in the illustrated embodiment includes a digital to analog converter port 252 for sending signals to the digital to analog converter 112, for adjusting an amplifier gain of the amplifiers 98 and 100 illustrated in FIG. 2.

As indicated above, in alternative embodiments, the amplifiers 98 and 100 and the digital to analog converter 112 illustrated in FIG. 2 may be omitted, and adjustments to compensate for attenuation of the acoustic pulse may be accomplished digitally, by using values in the attenuation compensation table (152) to amplify values representing amounts of reflected energy received at the first and second transducers (60 and 62) to compensate for attenuation, for example.

Referring back to FIG. 7, after block 250, or if at block 248 an amplifier gain update is not required, the receive sample routine 232 continues at block 246, which directs the microprocessor (120) to determine whether the value stored in the stored sample count store 233 is less than the value stored in the number of samples store 204 (illustrated in FIG. 4).

If at block 246 the stored sample count is less than the number of samples, then more samples are to be stored before the desired number of samples are stored, and the receive sample routine 232 continues at block 238, as discussed above. But if at block 246, the stored sample count is not less than the number of samples, then the receive sample routine 232 ends, and the master switch data command handler 132 continues at block 268, as illustrated in FIG. 6. Referring to FIG. 6, the codes at block 268 direct the microprocessor (120) to generate a data packet for the port data stored in the sample table (258).

Figure 9:
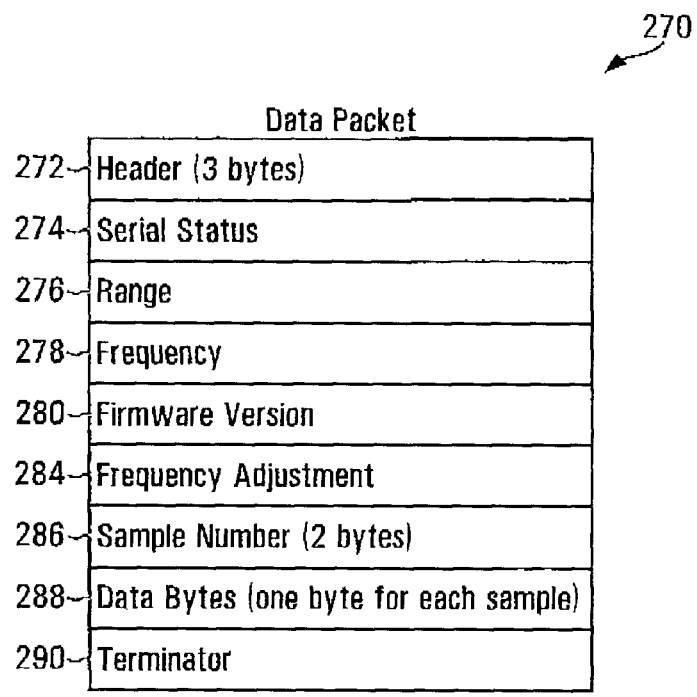
FIG. 9 is a schematic illustration of a data packet of the reflected energy measurement system of FIG. 1.

Referring to FIG. 9, a data packet is illustrated generally at 270. The data packet 270 includes a plurality of fields for storing various information, and is preferably encoded in an IP packet for transmission via the Ethernet interface 78 illustrated in FIGS. 2 and 4. In this embodiment, the data packet 270 includes a header field 272 which stores a 3-byte header. The data packet 270 also includes a serial status field 274, which includes 8 bits for identifying whether the data packet 270 includes port data or starboard data, for indicating any errors in parameters received in the switch data command 140 (illustrated in FIG. 5), and for indicating other conditions as may be desired.

Referring to FIGS. 4 and 9, the data packet 270 also includes a range field 276 for storing the value of the range store 180, a frequency field 278 for storing the nominal frequency value stored in the nominal frequency store 196, a firmware version field 280 for storing a firmware version value preconfigured in a firmware version store 282 in the configuration memory 124, a frequency adjustment field 284 for storing the frequency adjustment value of the frequency adjustment store 184, and a sample number field 286 for storing a two-byte number representing the number of samples stored in the number of samples store 204. The data packet 270 also includes a data bytes field 288 for storing the one-byte sample values from either the port energy amounts in the first column 260, or the starboard energy amounts in the second column 262, of the sample table 258 illustrated in FIG. 8. The data packet 270 also includes a terminator field 290, which in the illustrated embodiment is a byte represented by a pre-defined hexadecimal number.

Referring back to FIG. 6, the master switch data command handler 132 continues at block 292, which directs the microprocessor (120) to transmit the data packet 270 (illustrated in FIG. 9) via the Ethernet interface (78) to the controller (86). The master switch data command handler 132 then ends.

In summary, in the illustrated embodiment, a switch data command (140) sent to the first processor circuit (88) causes each of the first, second, third, fourth, fifth, and sixth transducers 60, 62, 64, 66, 68, and 70 (illustrated in FIG. 2) to transmit acoustic pulses generally simultaneously, and also causes the first processor circuit (88) to return port data via the Ethernet interface (78). After the first processor circuit (88) returns a port data packet (270) in response to a switch data command (140) requesting port data, subsequent switch data command (140) may request starboard data from the first processor circuit (88), and port and starboard data from the second and third processor circuits (174 and 176).

Therefore, referring back to FIG. 6, if at block 172 the switch data command is not a request for port data, then the switch data command is a request for starboard data, and the master switch data command handler 132 continues at block 294, which directs the microprocessor (120) to generate a data packet 270 (illustrated in FIG. 9) for starboard data, using starboard data from the second column 262 of the sample table 258 illustrated in FIG. 8. Block 296 then directs the microprocessor (120) to transmit the starboard data packet (270) via the Ethernet interface (78) to the controller (85). The master switch data command handler 132 then ends.

Referring back to FIG. 2, the second and third processor circuits 174 and 176 (which may be referred to as "slave processor circuits") are similar in many respects to the first processor circuit 88 (which may be referred to as the "master processor circuit") illustrated in FIG. 4. However, when switch data command (140) requesting port data are sent to the second and third processor circuits 174 and 176, these "slave processor circuits" do not cause any transducer units to transmit pulses, but rather these "slave processor circuits" respond by transmitting, to the controller (86), data packets including the requested data. Also, the second and third processor circuits 174 and 176 include master command handlers for responding to commands transmitted from the first processor circuit 88 in response to a signal sent by the first processor circuit 88 at block 212 illustrated in FIG. 6.

Figure 10:
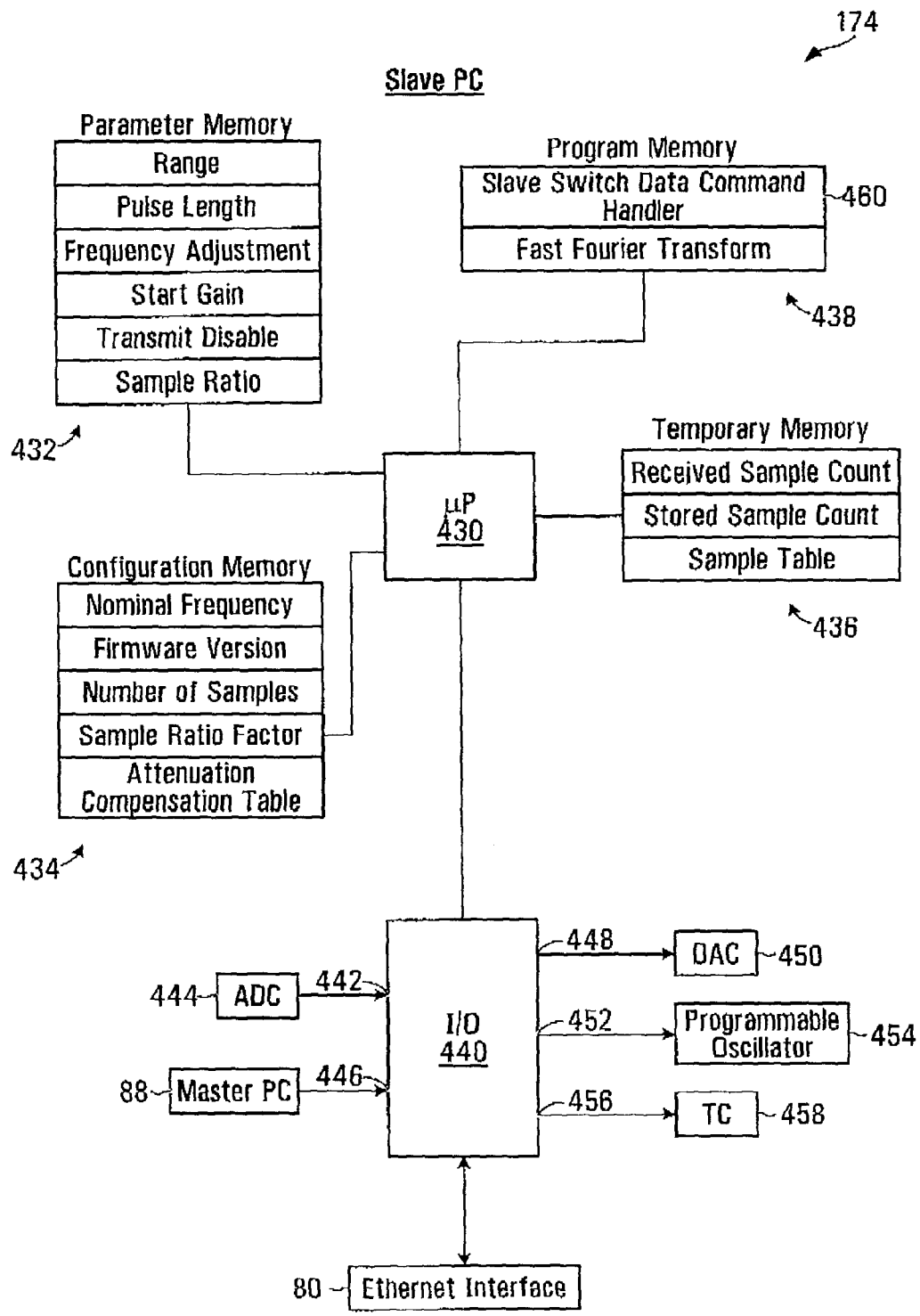
FIG. 10 is a schematic illustration of a second processor circuit of the control assembly of FIG. 2.

More particularly, referring to FIG. 10, the second processor circuit 174 is illustrated schematically, and is illustrative of the third processor circuit (176) (both of which may be referred to as "slave processor circuits"). The second processor circuit 174 includes a microprocessor 430, and a parameter memory 432, configuration memory 434, temporary memory 436, program memory 438, and an input output ("I/O") 440, all in communication with the microprocessor 430. The various memories illustrated in FIG. 10 may be random access memory (RAM) or magnetic media, for example, or a combination of these or numerous other computer-readable storage media that are well-known in the art.

The parameter memory 432 includes a range store, a pulse length store, a frequency adjustment store, a start gain store, a transmit disable store, and a sample ratio store, and these stores function generally in the manner of the like-named fields in the parameter memory 122 illustrated in FIG. 4.

The configuration memory 434 includes a nominal frequency store, a firmware version store, a number of samples store, a sample ratio factor store, and an attenuation compensation table, and these stores also function generally in the manner of the like-named fields of the configuration memory 124 illustrated in FIG. 4.

The temporary memory 436 includes a received sample count store, a stored sample count store, and a sample table, and these stores also function generally in the manner of the like-named fields in the temporary memory 126 illustrated in FIG. 4.

The I/O 440 includes an analog to digital converter port 442 for receiving signals from the analog to digital converter 444 illustrated in FIG. 2, and a processor circuit port 446 for communicating with the first (or "master") processor circuit 88. The I/O 440 also includes a digital to analog converter port 448 for communicating with the digital to analog converter 450 illustrated in FIG. 2, a programmable oscillator port 452 for communicating with the programmable oscillator 454 illustrated in FIG. 2, and a transmit circuitry port 456 for communicating with the transmit circuitry 458 illustrated in FIG. 2. The I/O 440 is also in communication with the Ethernet interface 80 illustrated in FIG. 2.

Figure 11:
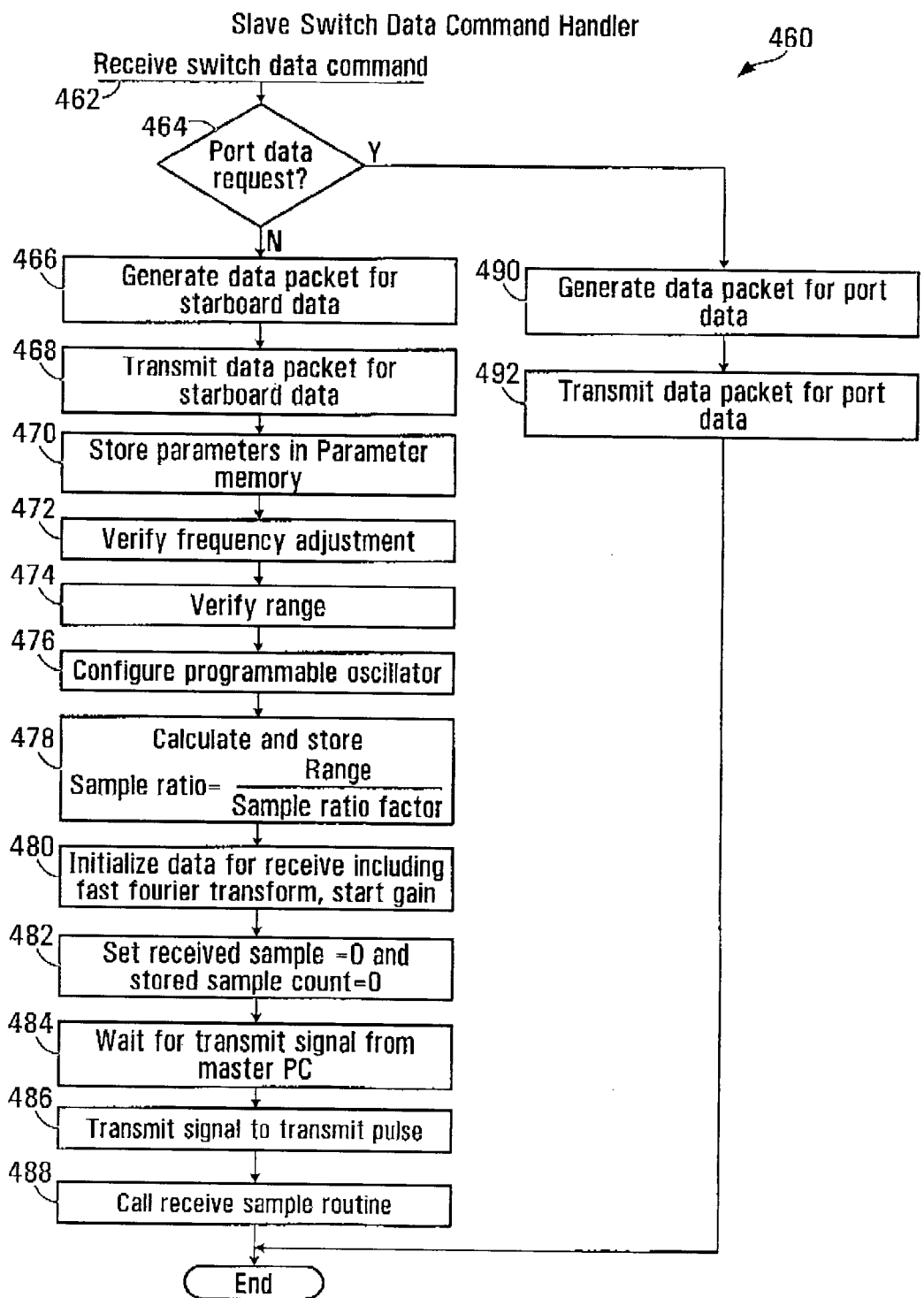
FIG. 11 is a schematic illustration of a slave switch data command handler executed by the second processor circuit of FIG. 10.

Still referring to FIG. 10, the program memory 438 includes a fast Fourier transform that operates in a like manner to the fast Fourier transform 210 illustrated in FIG. 4, and a slave switch data command handler 460. Referring to FIG. 11, the slave switch data command handler 460 is illustrated schematically.

As indicated above, after the first processor circuit (88) returns a port data packet (270) in response to a switch data command (140) requesting port data, subsequent switch data command (140) may request port and starboard data from the second and third processor circuits (174 and 176). Therefore, still referring to FIG. 11, the slave switch data command and handler 460 begins at 462 in response to an interrupt generated by the I/O (440) in response to a switch data command (140) received at the Ethernet interface (80).

The slave switch data command handler 460 continues at block 464, which directs the microprocessor (430) to determine whether the contents of the TCP packet number field 156 (shown in FIG. 5) indicate that port data is requested. If at block 464 starboard data is requested, then the slave switch data command handler 460 continues at block 466, which directs the microprocessor (430) to generate a data packet 270 (illustrated in FIG. 9) for starboard data, using starboard data from the sample table in the temporary memory 436 illustrated in FIG. 10. Block 468 then directs the microprocessor (430) to transmit the starboard data packet (270) via the Ethernet interface (80) to the controller (86).

The slave switch data command handler 460 continues at block 470, which directs the microprocessor (430) to store values from the range field 144, the pulse length field 146, the frequency adjustment field 148, the start gain field 150, and the transmit disable field 154 of the switch data command 140 into respective and like-named stores of the parameter memory 432 (illustrated in FIGS. 5 and 10).

The slave switch data command handler 460 continues at block 472, which directs the microprocessor (430) to verify whether the frequency adjustment value in the frequency adjustment store of the parameter memory 432 (illustrated in FIG. 10) has a permissible value, in a like manner to the codes of block 190 illustrated in FIG. 6 and discussed above.

The slave switch data command handler 460 continues at block 474, which directs the microprocessor (430) to verify the range value in the range store of the parameter memory 432 (illustrated in FIG. 10), in a like manner to the codes at block 192 illustrated in FIG. 6 and described above.

The slave switch data command handler 460 continues at block 476, which directs the microprocessor (430) to configure the programmable oscillator 454 (illustrated in FIGS. 2 and 10), in a like manner to the codes of block 194 illustrated in FIG. 6 and described above.

The slave switch data command handler 460 continues at block 478 which directs the microprocessor (430) to calculate a sample ratio for storing in the sample ratio store of the parameter memory 432 (illustrated in FIG. 10), in a like manner to the codes of block 198 illustrated in FIG. 6 and described above.

The slave switch data command handler 460 continues at block 480, which directs the microprocessor (430) to initialize the fast Fourier transform implemented by codes in the fast Fourier transform store of the program memory 438 (illustrated in FIG. 10), to initialize the sample table in the temporary memory 436 (illustrated in FIG. 10) by clearing data stores in the sample table and initializing pointers to the data stores in the sample table, and to transmit the start gain value from the start gain store of the parameter memory 432 (illustrated in FIG. 10) to the digital to analog converter (450), in a like manner to the codes at block 208 illustrated in FIG. 6 and described above.

The slave switch data command handler 460 continues at block 482, which directs the microprocessor (430) to set values stored in the received sample count store and the stored sample count store of the temporary memory 436 (illustrated in FIG. 10), in a like manner to the codes at block 209 illustrated in FIG. 6 and described above.

The slave switch data command handler 460 continues at block 484, which directs the microprocessor (430) to wait for a transmit signal from the master processor circuit (88). In the embodiment shown, the codes at block 484 direct the microprocessor (430) to wait for a signal that is sent by the master processor circuit (88) at block 212 of the master switch data command handler 132 (illustrated in FIG. 6).

The slave switch data command handler 460 continues at block 486, which directs the microprocessor (430) to cause the third and fourth transducers (64 and 66) to transmit an acoustic signal by sending a signal to the transmit circuitry (458), in a like manner to the codes at block 222 illustrated in FIG. 6 and described above.

The slave switch data command handler 460 continues at block 488, which directs the microprocessor (430) to receive samples representing amounts of reflected energy measured at the third and fourth transducers (64 and 66), in a like manner to the codes at block 232 illustrated in FIGS. 6 and 7 and described above. The slave switch data command handler 460 then ends.

If at block 464, port data is requested, then the slave switch data command handler 460 continues at block 490, which directs the microprocessor (430) to generate a data packet for the port data stored in the sample table of the temporary memory 436 (illustrated in FIG. 10), in a like manner to the codes of block 268 illustrated in FIG. 6 and described above. The slave switch data command handler 460 continues at block 492, which directs the microprocessor (430) to transmit the data packet (270) to a destination via the Ethernet interface (80) to the controller (86). The slave switch data command handler 460 then ends.

In this embodiment, the parameters stored in the parameter memory 432 of the second processor circuit 174 will not be updated until after samples have been taken. Therefore, in this embodiment, data collected from the first transmission of acoustic signals may be disregarded. As indicated above, the second processor circuit 174 is illustrative of the third processor circuit 176.

Referring back to FIGS. 1 and 2, in this embodiment, switch data commands (140) are transmitted from the controller 86 via the Ethernet switch 84 to the control assembly 56 of the port and starboard transducer unit 22, and data packets (270) are transmitted from the first, second, and third processor circuits 88, 174, and 176 via the Ethernet switch 84 to the controller 86. The controller 86 therefore controls the port and starboard transducer unit 22 by transmitting various switch data command (140).

Figure 12:
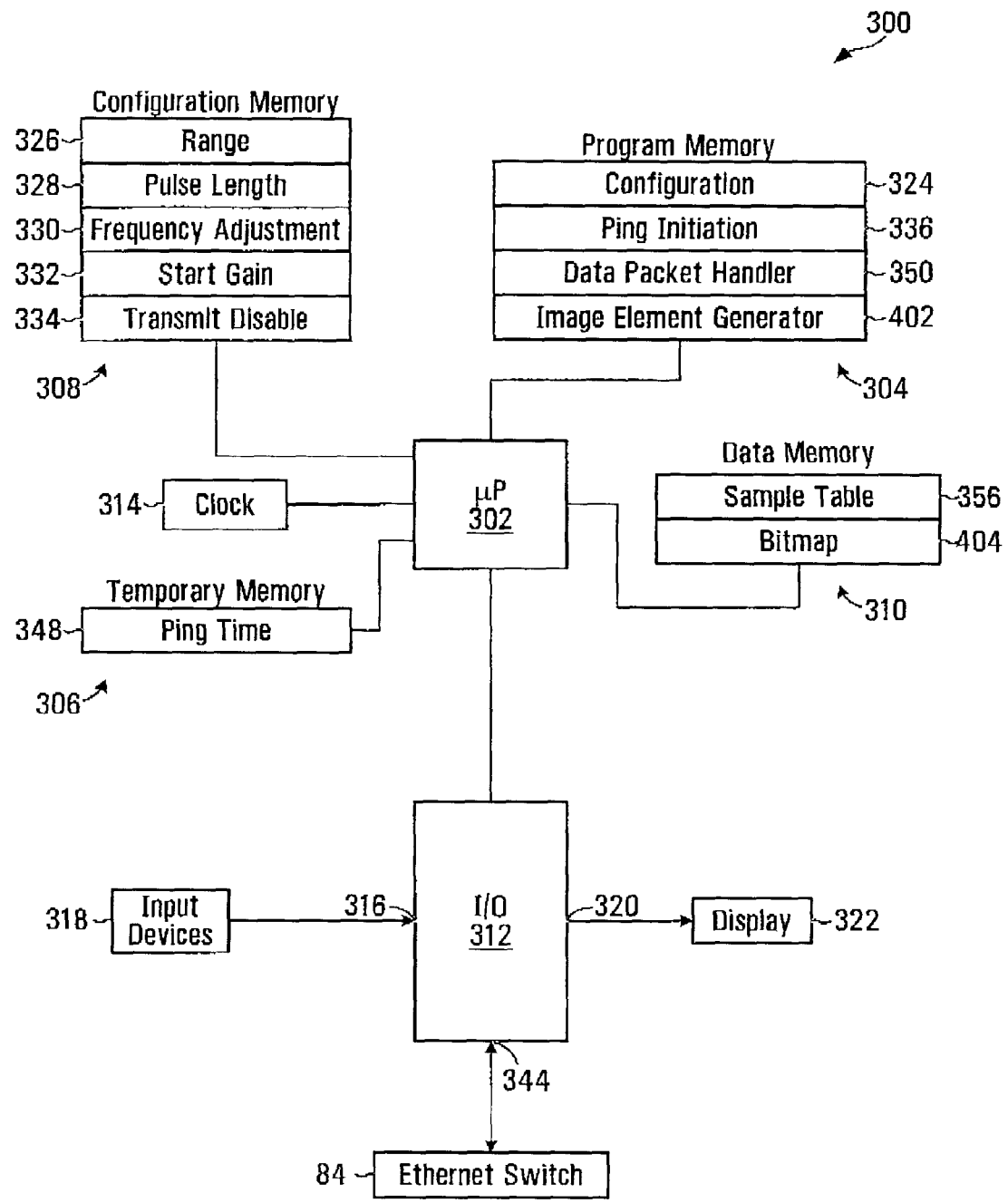
FIG. 12 is a schematic illustration of a control processor circuit of the reflected energy measurement system of FIG. 1.

Referring to FIGS. 1 and 12, the controller 86 includes a controller processor circuit illustrated schematically at 300. The controller processor circuit 300 includes a microprocessor 302, and program memory 304, temporary memory 306, configuration memory 308, data memory 310, an I/O 312, and a clock 314, all in communication with the microprocessor 302. The various memories illustrated in FIG. 12 may be random access memory (RAM) or magnetic media, for example, or a combination of these or numerous other computer-readable storage media that are well-known in the art.

The I/O 312 includes an input port 316 for receiving input signals from one or more input devices, shown generally at 318. The input devices 318 may include one or more of a keyboard, mouse, or other pointing device, for example. The I/O 312 also includes a display port 320 for transmitting signals to a display 322, which is also illustrated in FIG. 1.

The program memory 304 is a computer-readable medium that generally includes codes for directing the microprocessor (302) to carry out various functions of the controller (86), and for example, includes configuration codes 324, which facilitate use of the input devices 318 and the display 322 to configure various values for storing in the configuration memory 308. In particular, in this embodiment, the configuration codes 324 co-operate with the microprocessor 302 to enable a user to use the input devices 318 and the display 322 to set values for a range store 326, and pulse length store 328, frequency adjustment stores 330, a start gain store 332, and a transmit disable store 334 in the configuration memory 308. The frequency adjustment stores 330 preferably include a plurality of frequency adjustment values, representing adjustments of respective nominal frequencies of the various transducers of the port and starboard transducer unit (22). Values stored in the range store 326, pulse length store 328, frequency adjustment stores 330, start gain store 332, and transmit disable store 334 may be stored in the corresponding range field 144, pulse and length field 146, frequency adjustment field 148, start gain field 150, and transmit disable field 154 respectively of the switch data command 140 (illustrated in FIG. 5).

Figure 13:
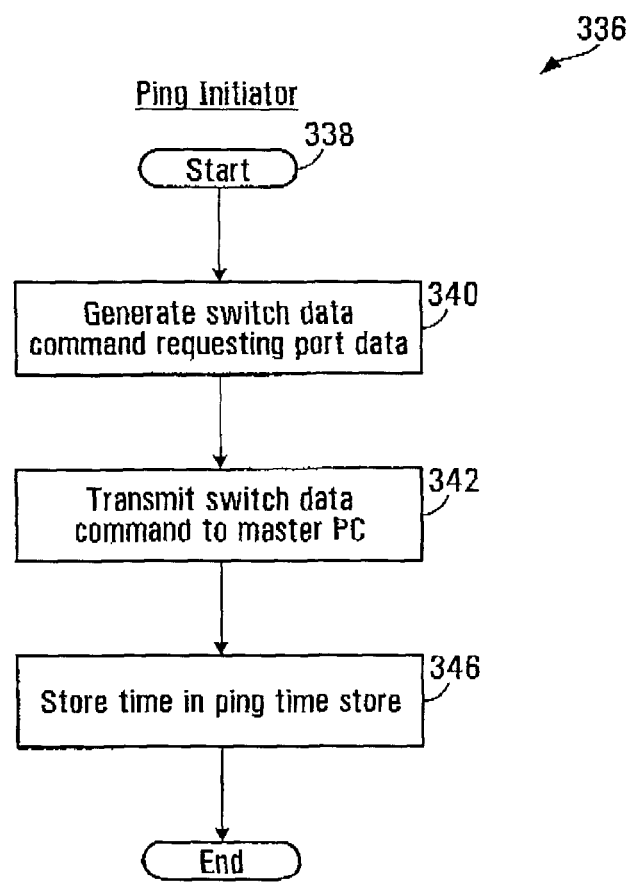
FIG. 13 is a schematic illustration of a ping initiator executed by the control processor circuit of FIG. 12.

The program memory 304 also includes ping initiator codes 336, which are illustrated schematically in FIG. 13. Referring to FIG. 13, the ping initiator 336 begins at 338, which may be in response to a user command entered using the input devices (318), or by a timing function of the controller processor circuit (300), for example.

The ping initiator 336 continues at block 340, which directs the microprocessor (302) to generate a switch data command (140) to request port data from the first processor circuit (88), in response to values stored in the configuration memory (308). As discussed above, the Ethernet interfaces (78, 80, and 82) of the processor circuits (88, 174, and 176) each have their own IP address, and switch data commands are addressed to particular processor circuits at those IP addresses in this embodiment.

Referring to FIGS. 5, 12, and 13, the switch data command (140) generated at block 340 in this embodiment includes a header field 142 having a hexadecimal value as discussed above, values in the range field 144, pulse length field 146, frequency adjustment field 148, start gain field 150, and transmit disable field 154 having the values from the range store 326, pulse length store 328, the relevant store of the frequency adjustment stores 330, start gain store 332, and transmit disable store 334 respectively of the configuration memory 308. The switch data command 140 generated at block 340 also has a TCP packet number field 156 storing a hexadecimal value indicating a request for port data, and a terminator field 158 storing a pre-defined hexadecimal value.

Referring back to FIG. 13, the ping initiator 336 continues at block 342, which directs the microprocessor (302) to transmit the switch data command generated at block 340 to the first processor circuit (88), through the Ethernet switch (84) which is in communication with the I/O (312) at an Ethernet port (344).

Referring to FIGS. 12 and 13, the ping initiator 336 continues at block 346, which directs the microprocessor 302 to store a current time from the clock 314 in a ping time store 348 in the temporary memory 306. The ping initiator 336 then terminates.

Referring to FIG. 12, the program memory 304 also includes a data packet handler 350 including codes for directing the microprocessor (302) to handle a port data packet 270 (illustrated in FIG. 9) from the first processor circuit (88).

Figure 14:
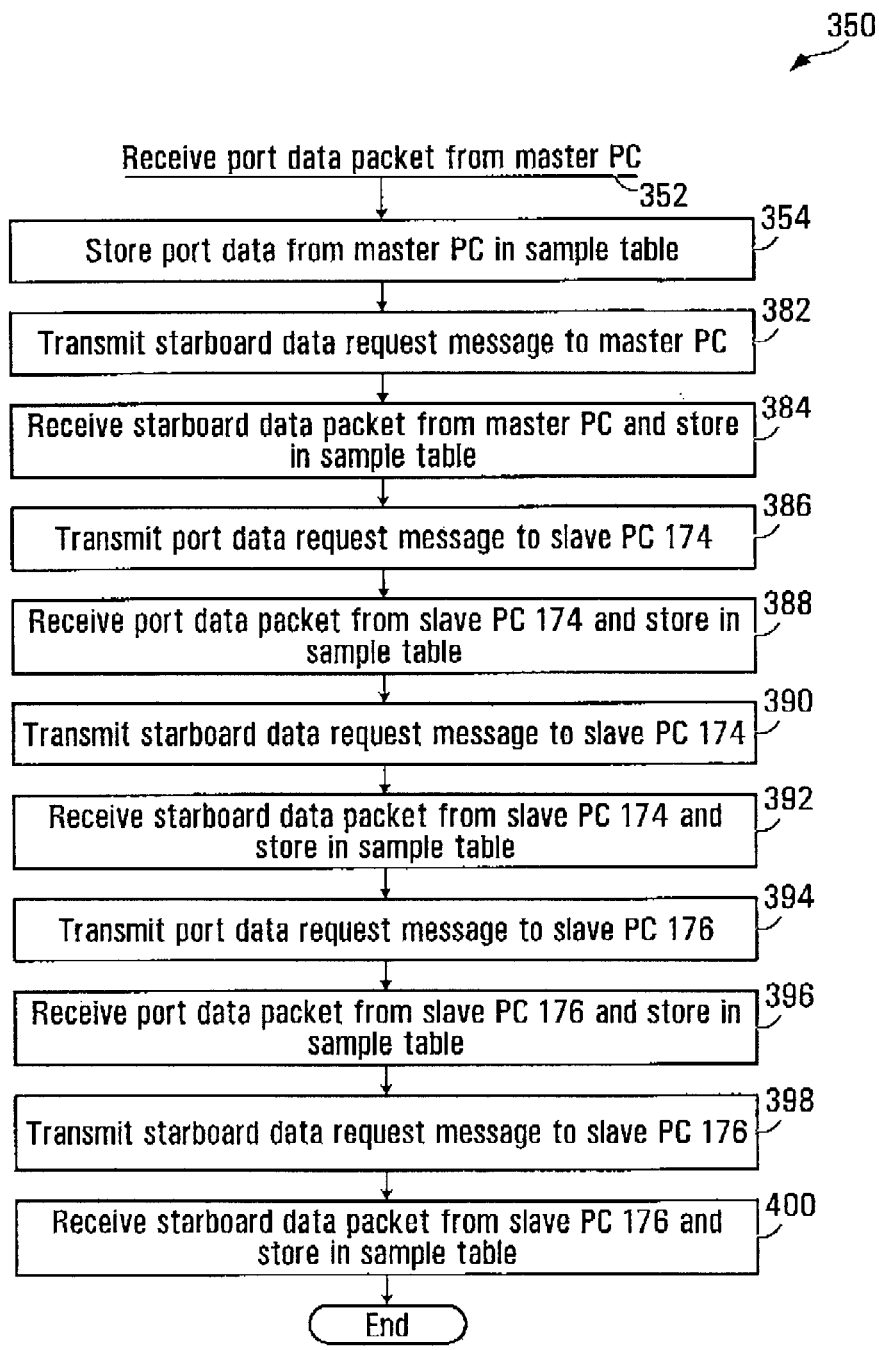
FIG. 14 is a schematic illustration of a data packet handler executed by the control processor circuit of FIG. 12.

Referring to FIG. 14, the data packet handler 350 is illustrated schematically, and begins at 352 in response to a port data packet (270) received from the first processor circuit (88). A data packet received from the first processor circuit (88) may be identified by an IP address of the Ethernet interface (78) of the first processor circuit (88), for example, and a port data packet may be identified by a bit in the serial status field 274 of the data packet 270 (illustrated in FIG. 9).

The data packet handler 350 continues at block 354, which directs the microprocessor (302) to store the data from the data bytes field 288 of the data packet 270 (illustrated in FIG. 9) representing port data from the first processor circuit (88) into a sample table entry of a sample table 356 in the data memory 310 illustrated in FIG. 12.

Figure 15:
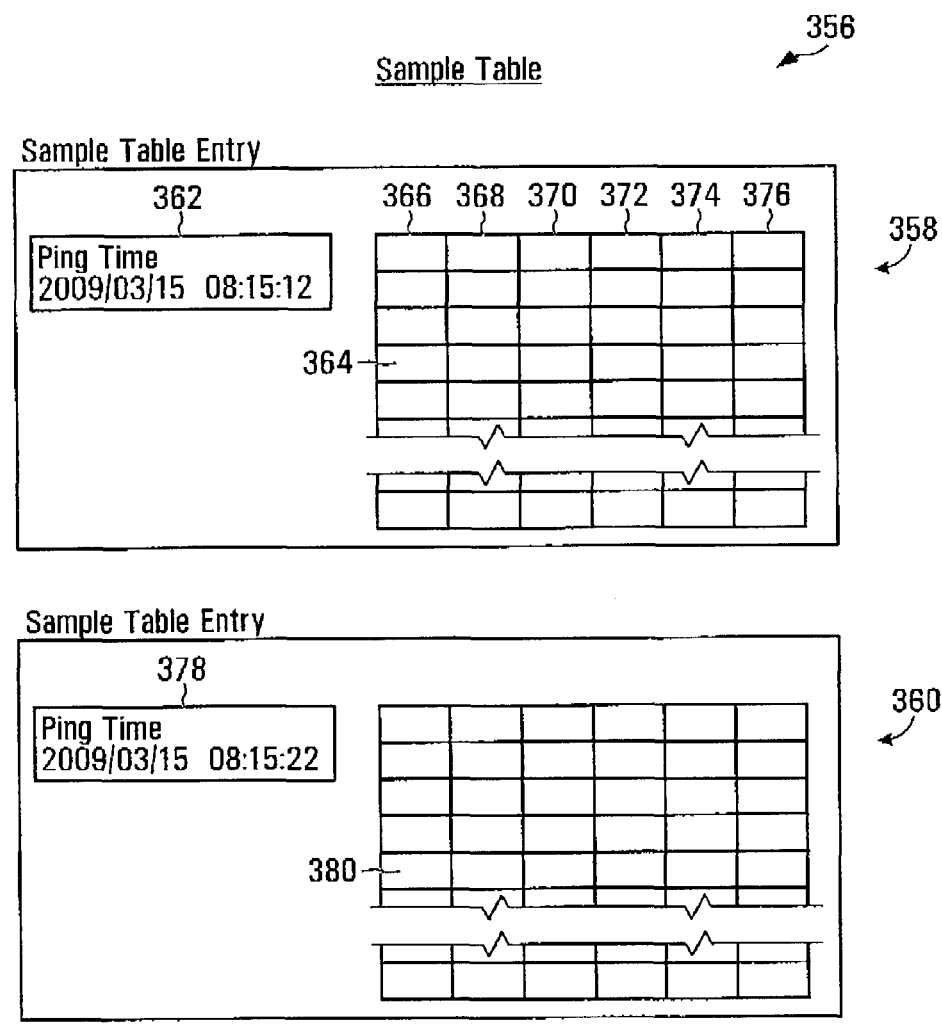
FIG. 15 is a schematic illustration of a sample table of the control processor circuit of FIG. 12.

Referring to FIG. 15, the sample table 356 is illustrated schematically, and includes first and second exemplary sample table entries 358 and 360. In general, the sample table 356 includes a sample table entry (such as those illustrated at 358 and 360, for example) to store data measured in response to one acoustic pulse, and each sample table entry is identifiable by a time when the acoustic pulse was sent.

Therefore, the first sample table entry 358 includes a ping time field 362 for storing a ping time retrieved from the ping time store 348 in the temporary memory 306 illustrated in FIG. 12. The sample table entry 358 also includes a two-dimensional array 364 having first, second, third, fourth, fifth, and sixth columns 366, 368, 370, 372, 374, and 376. In this embodiment, the two-dimensional array 364 includes a plurality of rows corresponding to the number of samples that were collected following each acoustic pulse or ping (as identified by the number of samples store 204 illustrated in FIG. 4), and corresponding to the number of samples transmitted in the data packet 270 as determined by the sample number field 286 (illustrated in FIG. 9). Thus, each row of the two-dimensional array 364 stores a plurality of values representing amounts of reflected energy reflected from a plurality of acoustic pulses at a plurality of respective different frequencies, but all at a common delay time following transmission of the acoustic pulses, and therefore represent reflection at a common distance from a device that transmitted the acoustic pulses and measured the reflected energy.

Also, in this embodiment, the first column 366 stores port data received from the first processor circuit (88), the second column 368 stores starboard data received from the first processor circuit (88), the third column 370 stores port data received from the second processor circuit (174), the fourth column 372 represents starboard data received from the second processor circuit (174), the fifth column 374 stores port data received from the third processor circuit (176), and the sixth column 376 stores starboard data received from the third processor circuit (176). Therefore, in this embodiment, the first and second columns 366 and 368 store port and starboard data respectively representing amounts of reflected energy at a first frequency, the third and fourth columns 370 and 372 store port and starboard data respectively representing amounts of reflected energy at a second frequency, and the fifth and sixth columns 374 and 376 store port and starboard data respectively representing amounts of reflected energy at a third frequency.

The second exemplary sample table entry 360 in this embodiment also includes a ping time field 378, storing a ping time subsequent to the ping time stored in the ping time field 362. The second exemplary sample table entry 360 also includes a two-dimensional array 380 storing data in respect of the ping identified by the ping time field 378, in a similar manner to the two-dimensional array 364.

Referring back to FIG. 14, the data packet handler 350 continues at block 382, which directs the microprocessor (302) to transmit a switch data command (140) requesting starboard data to the first processor circuit (88). The data packet handler 350 continues at block 384, which directs the microprocessor (302) to receive a data packet (270) from the first processor circuit (88), and to store data from the data packet in the sample table (356) in a sample table entry corresponding to the time specified by the ping time store (348).

The data packet handler 350 continues at block 386, which directs the microprocessor (302) to transmit a switch data command (140) requesting port data from the second processor circuit (174). The data packet handler 350 continues at block 388, which directs the microprocessor (302) to receive a port data packet (270) from the second processor circuit (174) and to store data from the port data packet in a sample table entry of the sample table (356) corresponding to the time specified by the ping time store (348).

The data packet handler 350 continues at block 390, which directs the microprocessor (302) to transmit a switch data command (140) requesting starboard data from the second processor circuit (174). The data packet handler 350 continues at block 392, which directs the microprocessor (302) to receive a starboard data packet (270) from the second processor circuit (174) and to store data from the starboard data packet in a sample table entry of the sample table (356) corresponding to the time specified by the ping time store (348).

The data packet handler 350 continues at block 394, which directs the microprocessor (302) to transmit a switch data command (140) requesting port data from the third processor circuit (176). The data packet handler 350 continues at block 396, which directs the microprocessor (302) to receive a port data packet (270) from the third processor circuit (176) and to store data from the port data packet in a sample table entry of the sample table (356) corresponding to the time specified by the ping time store (348).

The data packet handler 350 continues at block 398, which directs the microprocessor (302) to transmit a switch data command (140) requesting starboard data from the third processor circuit (176). The data packet handler 350 continues at block 400, which directs the microprocessor (302) to receive a starboard data packet (270) from the third processor circuit (176) and to store data from the starboard data packet in a sample table entry of the sample table (356) corresponding to the time specified by the ping time store (348). The data packet handler 350 then ends.

Having regard to the blocks of code illustrated in FIG. 14, it will be appreciated that the controller processor circuit (300) is configured to receive a plurality of signals from an energy measuring device (the port and starboard transducer unit 22, in this embodiment).

Referring back to FIGS. 1 and 12, it will be appreciated that the ping initiator 336 may be invoked periodically, and preferably at a regular frequency, as the boat 28 tows the port and starboard transducer unit 22 through the water 24, preferably in a constant direction. In this manner, the sample table 356 accumulates a number of sample table entries representing data collected for respective acoustic pulses or pings. The program memory 304 also includes an image element generator 402 for generating an image, in response to the signals received by the blocks of code in FIG. 14, to be stored in a bitmap 404 in the data memory 310, and for being displayed on the display 322, for example.

Figure 16:
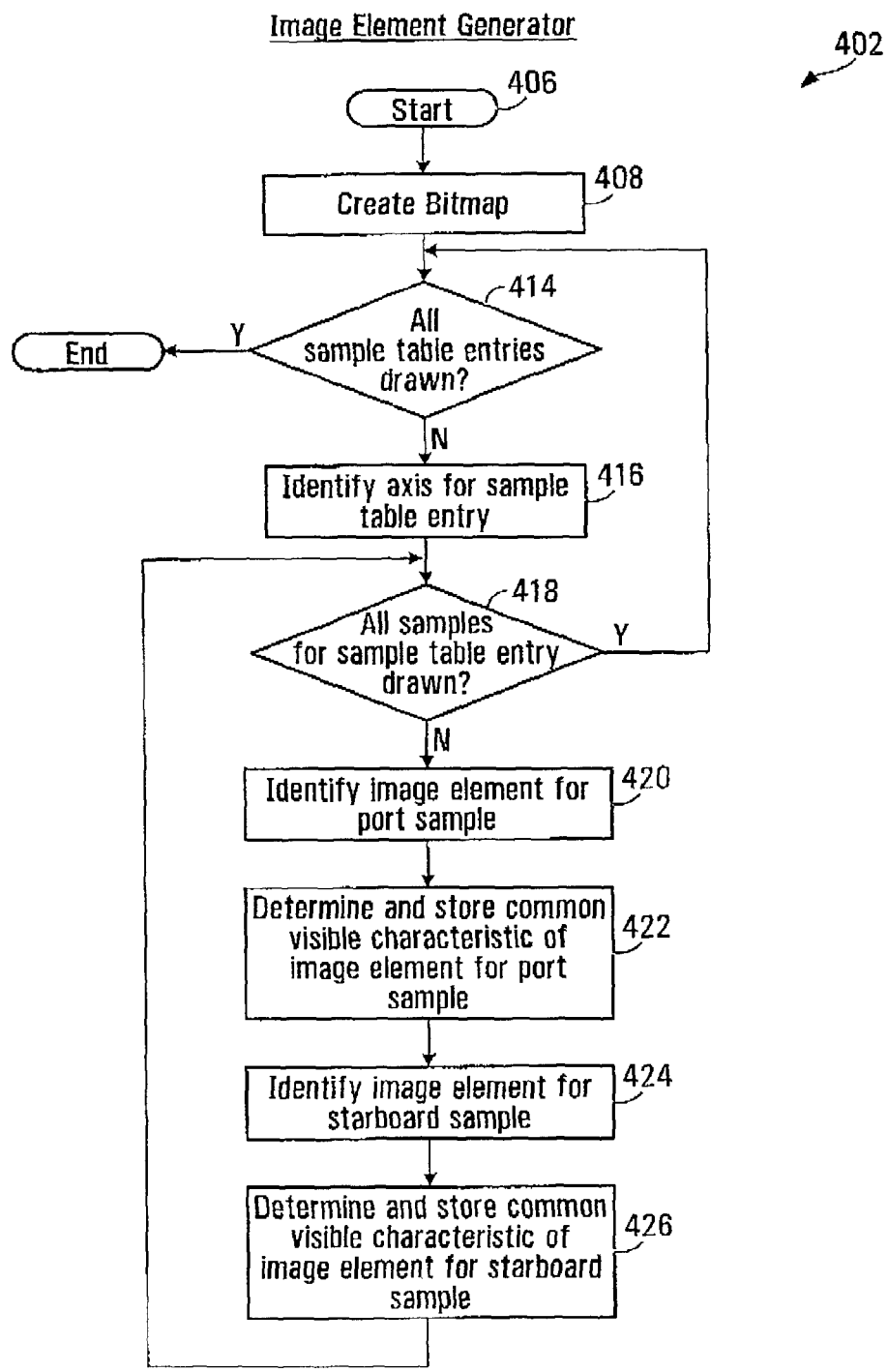
FIG. 16 is a schematic illustration of an image element generator executed by the control processor circuit of FIG. 12.

Referring to FIG. 16, the image element generator 402 is illustrated schematically. The image element generator 402 begins at 406, which may be in response to the signals received by the blocks of code in FIG. 14. The image element generator continues at block 408, which directs the microprocessor (302) to create the bitmap 404 stored in the data memory 310 illustrated in FIG. 12.

Figure 17:
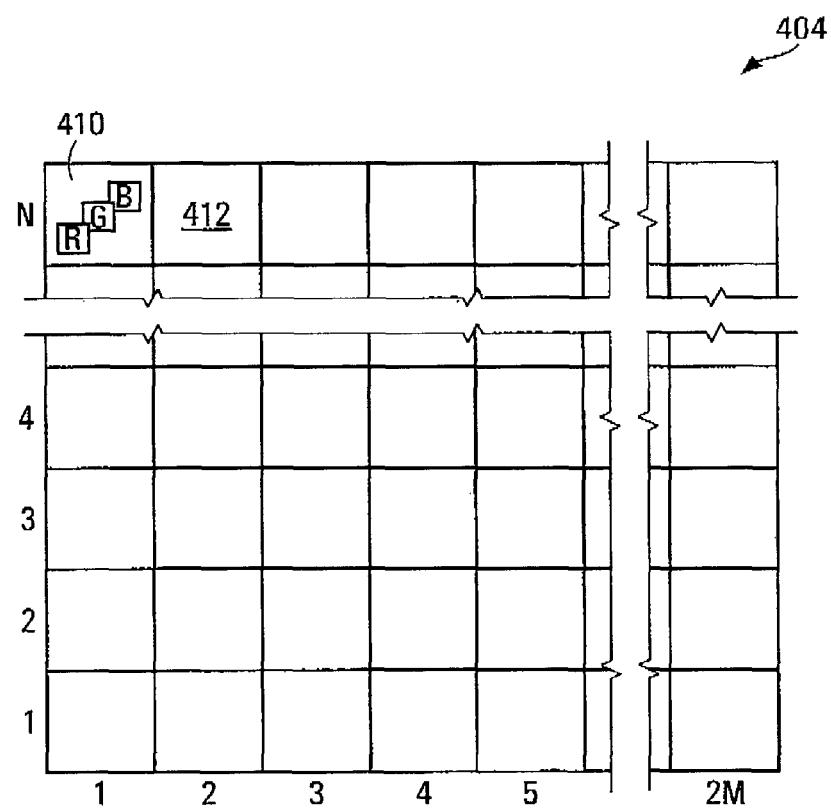
FIG. 17 is a schematic illustration of a bitmap of the control processor circuit of FIG. 12.

Referring to FIG. 17, the bitmap 404 is illustrated schematically. The bitmap 404 is a two-dimensional array of elements (two of which are shown at 410 and 412, for example), each for storing data representing a visible characteristic of an image element. These elements may also be referred to as "pixels". In this embodiment, if, following each acoustic pulse or ping, M samples are taken (and thus there are M rows in each of the two-dimensional arrays 364 and 380, for example, illustrated in FIG. 13), then the bitmap 404 has 2M columns, M columns for port data and M columns for starboard data. Generally, each such column includes image elements associated with a common reflection time, and therefore a common distance, from a device that transmitted acoustic pulses and measured reflected energy amounts therefrom, which may be referred to as an "energy measuring device", such as the port and starboard transducer unit (22). Also, in this embodiment, if there are N acoustic pulses following which samples have been stored (and thus there are N sample table entries, such as 358 and 360 for example, in the sample table 356 illustrated in FIG. 15), then the bitmap 404 has N rows, one for each such acoustic pulse. Therefore, each such row generally represents reflected energy amounts from a plurality of acoustic pulses at different frequencies.

As is known in the art, a bitmap is usable by conventional software to cause an image to be displayed on a display. Therefore, in this embodiment, the bitmap 404 represents a display co-ordinate system for use by an image generator for displaying on a display.

Referring back to FIG. 16, the image element generator 402 iterates through each of the sample table entries (such as 358 and 360, for example in the sample table 356 illustrated in FIG. 15), and includes various blocks of code for causing data stored in the sample table entries to be represented as visible characteristics of image elements in the bitmap 404 (illustrated in FIG. 17). Still referring to FIG. 16, the image element generator 402 continues at block 414, which directs the microprocessor (302) to determine whether all of the sample table entries in the sample table (356) have been represented in the bitmap (404). If so, the image element generator 402 ends.

However, if at block 414 not all of the sample table entries in the sample table (356) have been, represented in the bitmap (404), then the microprocessor (302) identifies a particular sample table entry for this iteration, and continues at block 416, which directs the microprocessor (302) to identify an axis associated with the particular sample table entry of this iteration. In this embodiment, if the sample table entries are numbered successively from 1 to N, then the axis identified by codes at block 416 is the row in the bitmap (404) having a number corresponding to the number from 1 to N of the particular sample table entry. Because image elements in a row of the bitmap (404) are associated with respective distances, in the manner set out above, from a device that transmits acoustic pulses and measures amounts of reflected energy therefrom, successive respective positions of image elements in the axis identified at block 416 are associated with successive respective distances from the device, which may be referred to as an "energy measuring device", such as the port and starboard transducer unit (22).

In this embodiment, each of the two-dimensional arrays in each sample table entry has M rows representing M samples taken in response to an acoustic pulse, and the image element generator 402 iterates through each of the M samples to determine common visible characteristics of image elements for each such sample. Therefore, the image element generator 402 continues at block 418, which directs the microprocessor (302) to determine whether all of the samples in the particular sample table have been represented in the bitmap (404). If so, the image element generator returns to block 414.

However, if at block 418, not all of the samples in the particular sample table have been represented in the bitmap (404), then the image element generator 402 continues at block 420, which directs the microprocessor (302) to identify an image element in the bitmap (404) associated with the port data of the current sample.

Referring back to FIG. 17, port data in this embodiment are illustrated generally on the left half of the bitmap 404, and starboard data are represented generally on the right half. The recorded samples representing amounts of reflected energy are recorded successively, and thus represent progressively increasing delay and progressively increasing distance from the energy measuring device. Therefore, successive port data are represented in the bitmap 404 in image elements successively leftward from a center of the bitmap 404, whereas starboard data are represented successively rightward elements from the center. Therefore, if a particular sample is represented by a successive number i from 1 to M, then the image element associated with a port sample is in a column identified by M−i+1, and the image element associated with starboard data for the sample is in the column M+i.

Referring back to FIG. 16, the image element generator 402 continues at block 422, which directs the microprocessor (302) to determine and store a common visible characteristic of the image element identified in block 420.

Referring to FIG. 17, in this embodiment, the bitmap 404 includes elements (such as those illustrated at 410 and 412, for example), and each such element includes 3 bytes of storage: one byte for storing a value representing an intensity of red, one byte for storing a value representing an intensity of green, and one byte for storing a value representing an intensity of blue. As is known in the art, red, green, and blue may be referred to as an additive colour set and a combination of respective intensities of these additive colours can produce numerous desirable colours. Although this embodiment uses red, green, and blue additive colours (which are commonly known as the "RGB additive colour model"), alternative embodiments may use different additive colour sets.

Referring back to FIG. 15, it will be recalled that in the exemplary sample table entry 358, the first, third, and fifth columns 366, 370, and 374 store values representing respective amounts of reflected energy at respective different frequencies on the port side, and in this embodiment, the first column 366 stores amounts of reflected energy at a first frequency, the third column 370 stores amounts of reflected energy at a second frequency greater than the first frequency, and the fifth column 374 stores amounts of reflected energy at a third frequency greater than the second frequency. Referring to FIGS. 15, 16, and 17, the codes at block 422 direct the microprocessor (302) to store in the red component of the image element identified at block 420 the one-byte value retrieved from column 366 in this example, to store in the green component of the image element identified at block 420 the one-byte value retrieved from the third column 370, and to store in the blue component of the image element identified at block 420 the one-byte value retrieved from the fifth column 374 in this example. In this embodiment, intensities of the red, green, and blue components directly correspond to the normalized amounts of reflected energy. However, in other embodiments, the intensities of the red, green, and blue components may be scaled by respective scale factors, for example. Therefore, in summary, block 422 directs the microprocessor (302) to determine a common visible characteristic (in this embodiment, colour) of the image element identified at block 420, in response to respective amounts of reflected energy at respective different frequencies.

Also, it is known that the colour red has a longer wavelength than the colour green, and the colour green has a longer wavelength than the colour blue. Therefore, in this embodiment, reflected energy measured at a first frequency is represented by a first additive colour having a first intensity, an amount of reflected energy at a second frequency greater than the first frequency is represented by an intensity of a second additive colour having a wavelength less than the wavelength of the first additive colour, and an amount of reflected energy at a third frequency greater than the second frequency is represented by an intensity of a third additive colour having a wavelength less than the wavelength of the second additive colour. It has been found that this association of frequencies with additive colours may produce an esthetically desirable image. However, it will be appreciated that alternatively, the respective amounts of energy at respective different frequencies may be associated with different additive colours, for example.

In summary, the codes at block 422 cause an image element of the bitmap 404 to have a colour (represented by respective intensity values of red, green, and blue in this embodiment) in response to a plurality of signals representing respective amounts of reflected energy at respective different frequencies, and measured at an energy measuring device such as the port and starboard transducer unit (22). The colour of the image element in this embodiment may more generally be referred to as a common visible characteristic of the image element, as the visible characteristic (colour, in this embodiment) is common to all of the amounts of reflected energy measured at the respective different frequencies. The image element is associated with a common distance from the device that transmitted the acoustic pulses and measured reflected energy therefrom.

In alternative embodiments, the common visible characteristic of the image element may, for example, include a shade of a pre-defined colour. In some such embodiments, the pre-defined colour may be black, and common visible characteristics of image elements may be greyscale shades calculated according to conventional greyscale techniques. In these embodiments, the red, green, and blue components of an image element have identical intensities, and these intensities may be calculated as 11% of the red component plus 60% of the green component plus 29% of the blue component of a full-colour image element determined in the manner above, for example.

Referring back to FIG. 16, the image element generator 402 continues at block 424, which directs the microprocessor (302) to identify an image element for the starboard data under consideration. As described above, in this embodiment, the image element associated with starboard data for a particular sample is located at a row of the bitmap 404 (illustrated in FIG. 15) identified at block 416, and in a column identified by M+i.

The image element generator 402 continues at block 426, which directs the microprocessor (302) to determine and store a common visible characteristic of the image element identified at block 424, for the starboard data of the current sample. The codes at block 426 include similar codes to those of block 422, except the data from the first, second and third frequencies may be drawn from the second, fourth, and sixth columns 368, 372, and 376 in the exemplary sample table entry 358 illustrated in FIG. 15. The image element generator 402 then continues at block 418 as described above. In summary, in the illustrated embodiment, image elements on a particular row of the bitmap (404) represent data received from a particular acoustic pulse or ping, and each image element includes a common visible characteristic measured at a time corresponding to a common distance from a device that transmitted acoustic pulses and measured reflected energy amounts therefrom.

In this embodiment, a colour of an image element is determined in response to respective amounts of reflected energy that are substantially simultaneously measured. However, it will be appreciated that in alternate embodiments the reflected energy amounts need not be measured simultaneously.

Successive rows in the bitmap (404) may be generated from successive acoustic pulses, to form a two-dimensional image representing objects such as those illustrated at 30 and 32 in FIG. 1.

However, in alternative embodiments, data may be collected from a rotary sonar scan, for example, and the co-ordinate system defined by the microprocessor (302) may be a polar co-ordinate system for displaying data received from the rotary sonar. In these embodiments, an axis representing data received from a single acoustic pulse may be a radius of the polar co-ordinate system, and data received from successive acoustic pulses may form a generally circular or sector-shaped image of submerged objects.

Referring back to FIGS. 1 and 12, the program memory 304 of the control processor circuit 300 may further include codes that are known in the art for displaying the data in the bitmap 404 on the display 322, and in the embodiment shown, these codes cause the processor circuit 300 to produce at least one signal to cause the red, green, and blue intensities stored in the bitmap 404 to be displayed on the display 322. The controller (86) thus operates an image generator in a reflected energy measurement system, and produces one or more signals for controlling at least one image element, in response to signals representing respective amounts of reflected energy at respective different frequencies, that may be stored in the bitmap 404 and displayed in the display 322.

It has been found that images generated in accordance with the embodiments described herein may advantageously illustrate data representing respective amounts of reflected energy at a plurality of respective frequencies, thus advantageously conveying information about the relative reflectivities of the different frequencies and displaying conveniently for a user an image that includes advantageous features inherent in all of the respective different frequencies at the same time.

For example, objects with strong preferential backscattering frequency will generally appear more strongly coloured on the bitmap image. It has been found that in many images generated in accordance with the embodiments described herein, the majority of objects and surfaces do not show a strong preferential frequency of backscatter, and thus appear in various hues near grey. The objects with stronger frequency selective properties advantageously appear more strongly highlighted to the user against this nearly grey background.

Objects may have a strong preferential backscattering frequency due to a variety of reasons, such as surface roughness of dimensions that are similar to the higher frequency sound wavelengths, but much smaller (hence invisible) to the lower frequency sound wavelength, for example. Also, ocean fauna and flora may have strong preferential backscattering frequencies due to their air pockets or bladders, for example. These air pockets tend to be of fairly uniform size in a population such as a school of fish, and hence resonate at a narrow range of acoustic frequencies, generating strong frequency-selective backscatter. Frequency selection may also occur due to preferential absorption of some frequencies over other. Objects having the aforementioned characteristics tend to be differently coloured, and thus highlighted in images generated in accordance with the embodiments described herein. The colour hue and intensity of colour of a target provide the user with additional information about that target, which may advantageously aid in the interpretation or identification of the target.

Because of the additive nature of the colour display described herein, the entire spectrum of colour hues is generally possible, thus advantageously providing highly detailed information about the frequency selective properties of objects observed in the images produced in accordance with the embodiments described herein. For example, objects with preferentially weaker backscatter at a given frequency (low, medium, or high) will generally show up as a different colour than those with preferentially stronger backscatter frequency. For example, objects with weak high frequency backscatter but relatively equal medium and low frequency backscatter will generally appear yellowish on the bitmap display, whereas those objects with simply stronger low frequency backscatter appear with a reddish hue in these embodiments. Objects with combinations of these frequency selective properties may appear, in this example, orange.

Furthermore, it is known that higher frequencies generally have shorter ranges in a medium such as water, for example, but that higher frequencies may result in images of improved detail over lower frequencies. Therefore, an image produced in accordance with some embodiments may advantageously exploit the respective advantages of different frequencies, conveniently combined in a single image, and producing a single image that may include greater detail and more clear detail than an image produced in response to signals representing reflected energy at a single frequency. In particular, when compared to an image generated in response to amounts of reflected energy at a single frequency, it has been found that images generated in accordance with the embodiments described herein more clearly illustrate edges of submerged objects. It has also been found that images generated in accordance with the embodiments described herein may advantageously have improved contrast over conventional images, and may overcome the effects of noise at a particular frequency by combining into common visible characteristics, signals representing respective amounts of reflected energy at respective different frequencies.

While specific embodiments of the invention have been described and illustrated, such embodiments should be considered illustrative of the invention only and not as limiting the invention as construed in accordance with the accompanying claims.

What is claimed is:

1. Method for controlling an image element associated with a distance from an energy measuring device, in a reflected energy measurement system, the method comprising:

producing at least one signal for controlling a color of the image element, in response to a plurality of signals representing respective amounts of reflected energy at respective different frequencies, measured at the energy measuring device at a time corresponding to the distance wherein said different frequencies comprise at least first, second, and third frequencies, said first frequency being less than said second frequency, and said second frequency being less than said third frequency; and wherein said color comprises a combination of first, second, and third additive colors having respective intensities corresponding to said amounts of said reflected energy at said first, second, and third frequencies respectively.

2. The method of claim 1 wherein said different frequencies are nonharmonic.

3. The method of claim 1 wherein said first additive color has a wavelength greater than a wavelength of said second additive color, and said wavelength of said second additive color is greater than a wavelength of said third additive color.

4. The method of claim 3 wherein said first additive color is red, said second additive color is green, and said third additive color is blue.

5. The method of claim 1 wherein said amounts of said reflected energy comprise substantially simultaneously measured amounts of said reflected energy at said respective different frequencies.

6. The method of claim 1 further comprising causing energy to be transmitted at said different frequencies prior to said producing, to facilitate measurement of said reflected energy received at the energy measuring device.

7. An imaging method in a reflected energy measurement system, the method comprising:
defining a display co-ordinate system having an axis, for use by an image generator;
defining a plurality of image elements generally along said axis;
associating successive respective positions of said image elements with successive respective distances from an energy measuring device; and
producing signals for causing said image generator to control each of said image elements, according to the method of claim 1.

8. A non-transitory computer readable medium encoded with computer-executable codes for directing a processor to carry out the method of claim 1.

9. An imaging apparatus for controlling an image element associated with a distance from an energy measuring device, in a reflected energy measurement system, the apparatus comprising:
means for receiving a plurality of signals from the energy measuring device, said plurality of signals representing respective amounts of reflected energy at respective different frequencies at a time corresponding to the distance wherein said different frequencies comprise at least first, second, and third frequencies, said first frequency being less than said second frequency, and said second frequency being less than said third frequency; and
means in communication with the means for receiving, for producing at least one signal for controlling a color of the image element, in response to said plurality of signals wherein said means for producing comprises means for producing color signals representing said color, wherein said means for producing color signals comprises means for producing first, second, and third additive color signals representing first, second, and third additive colors respectively, having respective intensities corresponding to said amounts of said reflected energy at said first, second, and third frequencies respectively.

10. The apparatus of claim 9 wherein said different frequencies are nonharmonic.

11. The apparatus of claim 9 wherein said first additive color has a wavelength greater than a wavelength of said second additive color, and said wavelength of said second additive color is greater than a wavelength of said third additive color.

12. The apparatus of claim 9 wherein said first additive color is red, said second additive color is green, and said third additive color is blue.

13. The apparatus of claim 9 wherein said amounts of said reflected energy comprise substantially simultaneously measured amounts of said reflected energy.

14. The apparatus of claim 9 further comprising means for causing energy to be transmitted at said different frequencies, to facilitate measurement of said reflected energy.

15. The apparatus of claim 9 further comprising:
means for defining a display co-ordinate system having an axis, for use by an image generator;
means for defining a plurality of image elements generally along said axis; and
means for associating successive respective positions of each of said plurality of image elements with successive respective distances from the energy measuring device;
wherein said means for producing comprises means for producing at least one signal for controlling a respective common visible characteristic of each of said plurality of image elements.

16. An imaging apparatus for controlling an image element associated with a distance from an energy measuring device, in a reflected energy measurement system, the apparatus comprising:
a processor in communication with the energy measuring device and operably configured to receive a plurality of signals from the energy measuring device, said plurality of signals representing respective amounts of reflected energy at respective different frequencies at a time corresponding to the distance wherein said different frequencies comprise first, second, and third frequencies, said first frequency being less than said second frequency, and said second frequency being less than said third frequency; and
a non-transitory computer readable medium in communication with the processor and encoded with computer-executable codes for directing the processor to produce at least one signal for controlling a color characteristic of the image element, in response to said plurality of signals wherein said codes include codes for directing the processor to produce color signals representing said color and wherein said codes include codes for directing the processor to produce first, second, and third additive color signals representing first, second, and third additive color respectively, having respective intensities corresponding to said amounts of said reflected energy at said first, second, and third frequencies respectively.

17. The apparatus of claim 16 wherein said different frequencies are nonharmonic.

18. The apparatus of claim 16 wherein said first additive color has a wavelength greater than a wavelength of said second additive color, and said wavelength of said second additive color is greater than a wavelength of said third additive color.

19. The apparatus of claim 16 wherein said first additive color is red, said second additive color is green, and said third additive color is blue.

20. The apparatus of claim 16 wherein said amounts of said reflected energy comprise substantially simultaneously measured amounts of said reflected energy.

21. The apparatus of claim 16 wherein said codes include codes for directing said processor to cause energy to be transmitted at said different frequencies, to facilitate measurement of said reflected energy.

22. The apparatus of claim 16 wherein said codes include codes for directing said processor to:
- define a display co-ordinate system having an axis, for use by an image generator;
- define a plurality of image elements generally along said axis;
- associate successive respective positions of each of said plurality of image elements with successive respective distances from the energy measuring device; and
- produce at least one signal for controlling a respective common visible characteristic of each of said plurality of image elements.

\* \* \* \* \*